US008339619B2

(12) United States Patent  
Misawa

(10) Patent No.: US 8,339,619 B2  
(45) Date of Patent: Dec. 25, 2012

(54) SYSTEM AND IMAGE PROCESSING METHOD AND APPARATUS FOR RE-USING AND RE-EDITING IMAGES

(75) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1491 days.

(21) Appl. No.: 10/986,105

(22) Filed: Nov. 12, 2004

(65) Prior Publication Data

US 2005/0105148 A1    May 19, 2005

(30) Foreign Application Priority Data

Nov. 14, 2003 (JP) ................................. 2003-385184

(51) Int. Cl.
G06F 3/12 (2006.01)
G06F 15/00 (2006.01)
G06K 15/00 (2006.01)
G06K 9/34 (2006.01)

(52) U.S. Cl. ......... 358/1.13; 358/1.9; 358/2.1; 382/173; 382/176

(58) Field of Classification Search .................. None
See application file for complete search history.

(56) References Cited

U.S. PATENT DOCUMENTS

| 5,436,981 | A |   | 7/1995  | Ishikawa |         |
|-----------|---|---|---------|----------|---------|
| 5,467,437 | A | * | 11/1995 | Fuse     | 358/1.16 |
| 5,907,632 | A | * | 5/1999  | Suzuki   | 382/187 |
| 6,084,984 | A |   | 7/2000  | Ishikawa |         |
| 6,606,103 | B1 | * | 8/2003 | Hamlet et al. | 715/764 |
| 6,909,805 | B2 |   | 6/2005 | Ma et al. | |
| 2002/0003897 | A1 | * | 1/2002 | Tanaka | 382/165 |
| 2002/0031283 | A1 | * | 3/2002 | Yamazaki | 382/311 |
| 2002/0044686 | A1 | * | 4/2002 | Yamazaki | 382/167 |
| 2003/0039394 | A1 | * | 2/2003 | Yamazaki | 382/176 |
| 2003/0107781 | A1 | * | 6/2003 | Ozawa | 358/506 |
| 2003/0118234 | A1 | * | 6/2003 | Tanaka et al. | 382/173 |
| 2004/0080789 | A1 | * | 4/2004 | Anderson | 358/2.1 |
| 2004/0169873 | A1 | * | 9/2004 | Nagarajan | 358/1.9 |

FOREIGN PATENT DOCUMENTS

| JP | 5-342408   | 12/1993 |
| JP | 6-4070     | 1/1994  |
| JP | 10-143414  | 5/1998  |
| JP | 2002-319025 | 10/2002 |
| JP | 2003-125198 | 4/2003  |

OTHER PUBLICATIONS

Office Action, dated Jun. 30, 2008, in JP 2003-385184.

* cited by examiner

*Primary Examiner* — Vincent Rudolph  
(74) *Attorney, Agent, or Firm* — Fitzpatrick, Cella, Harper & Scinto

(57) ABSTRACT

This invention provides an image processing system and image processing method, which can acquire a document such as a paper document or the like as data of a format that allows easy re-use and re-edit processes. Image information is acquired by scanning a document, and its features are recognized. The image information is converted into character codes, vector data, or a predetermined image format in accordance with the recognized features. In this case, parameters used upon recognizing the features of the image information are variably set, and the operations of the character process, vectorization, and image conversion are controlled in accordance with the set parameters.

10 Claims, 24 Drawing Sheets

F I G. 1
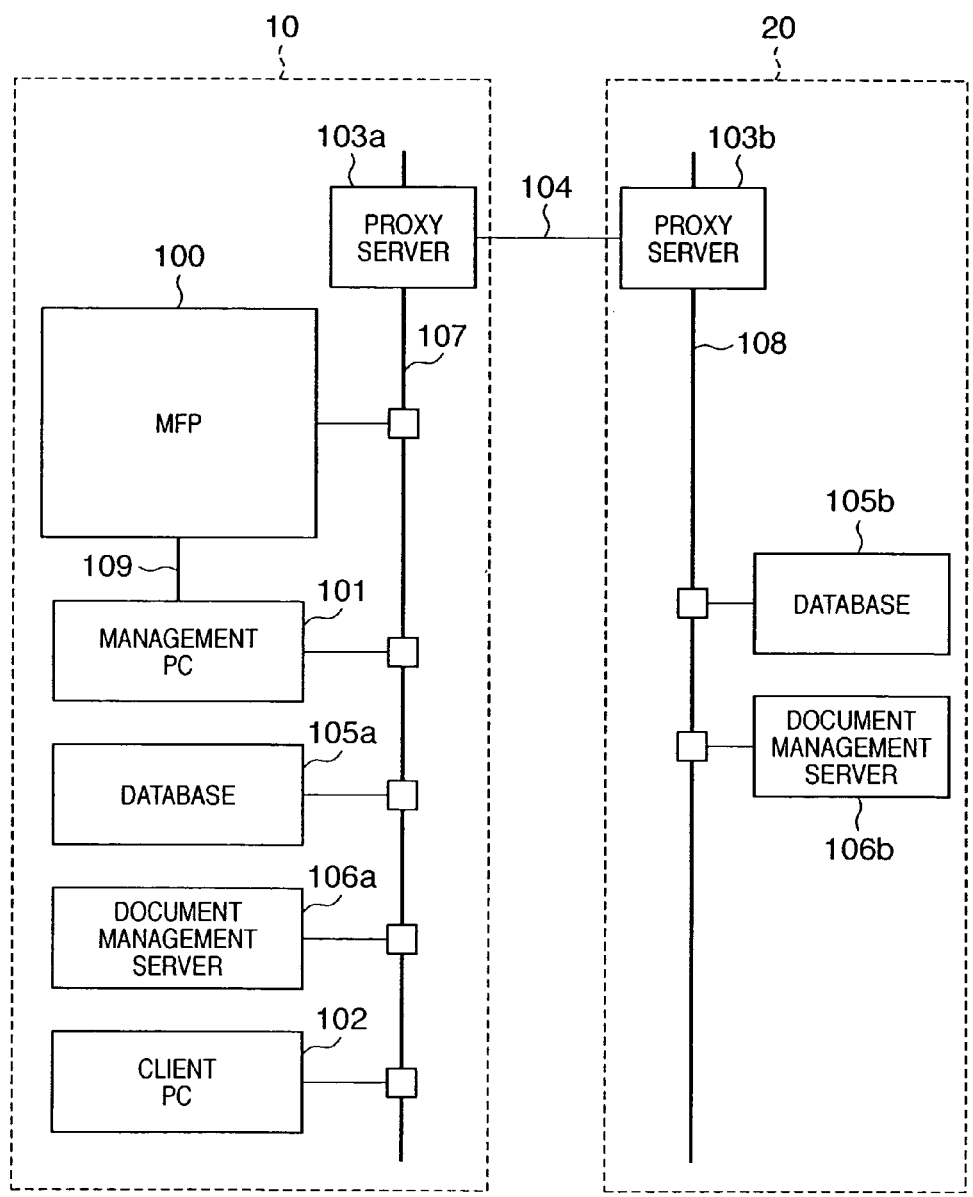

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY 1 : text  2 : picture  3 : table  4 : line  5 : photo

INPUT FILE INFORMATION

| TOTAL NUMBER OF BLOCKS | N(=6) |
|---|---|

F I G. 9
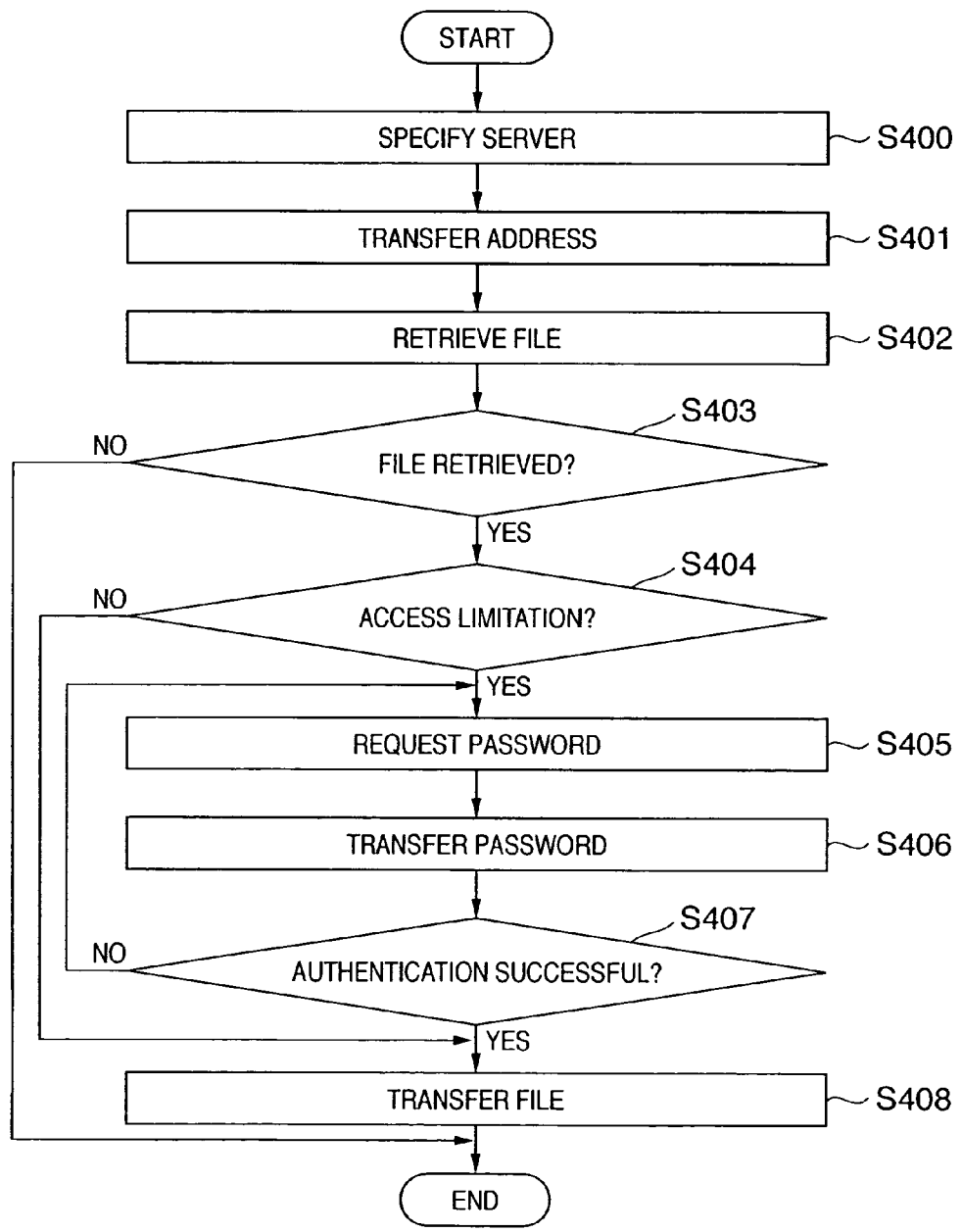

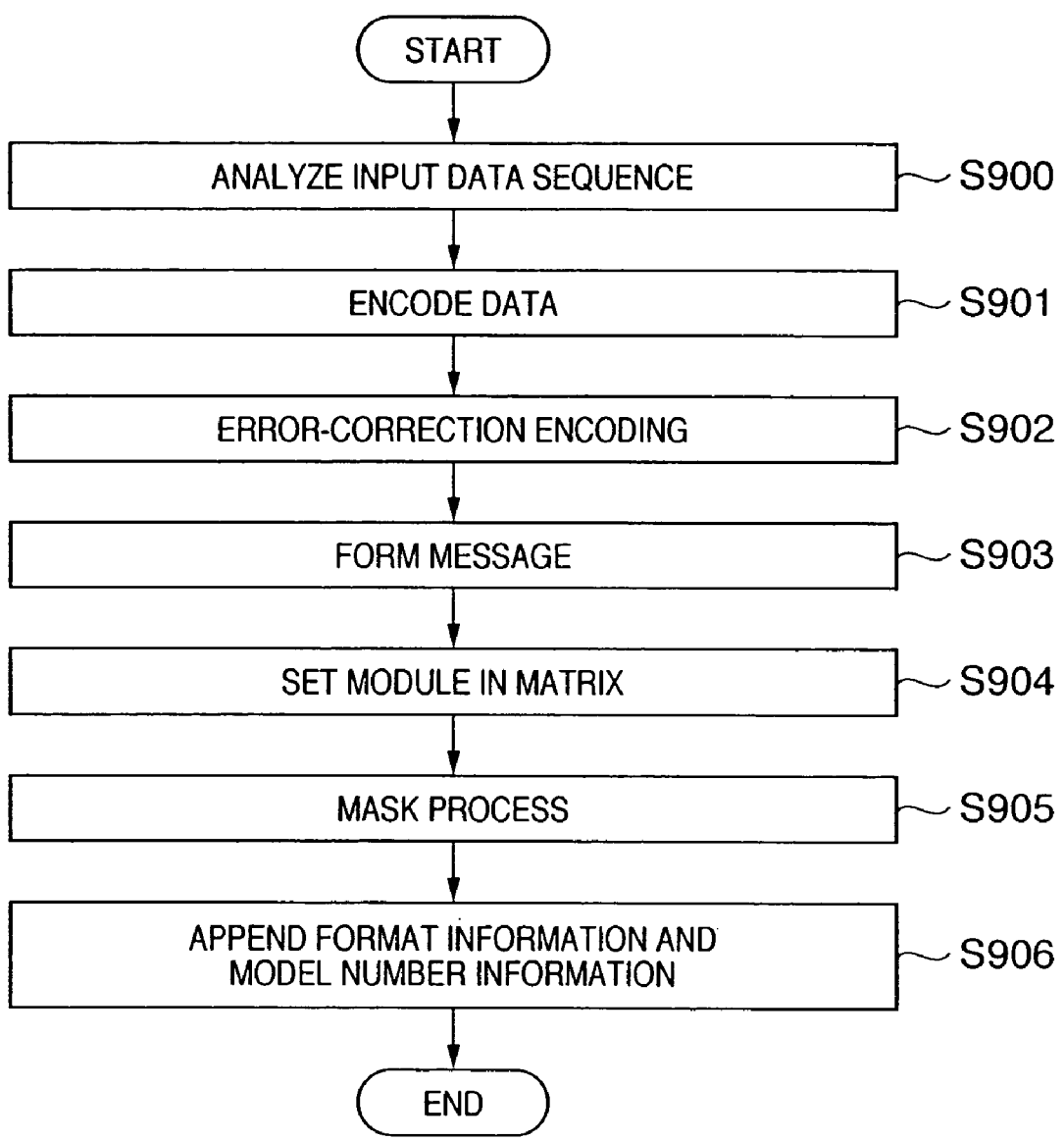

SYSTEM AND IMAGE PROCESSING METHOD AND APPARATUS FOR RE-USING AND RE-EDITING IMAGES

FIELD OF THE INVENTION

The present invention relates to an image processing system and image processing method, which convert an image scanned by an image processing apparatus such as a copying machine or the like into character codes, vector data, and the like that can be easily re-edited by existing document creation application software.

BACKGROUND OF THE INVENTION

In recent years, amid calls for environmental issues, move to paperless offices has been promoted. Hence, a document management system that scans paper documents accumulated and saved using binders or the like using a scanner, converts scanned document images into portable document format (to be abbreviated as "PDF" hereinafter) data, and accumulates and saves in an image storage device (database) has been conventionally developed.

On the other hand, some digital multi-function peripherals (to be abbreviated as "MFP" hereinafter) with expanded functions record pointer information in the image storage device that stores the corresponding image on a cover page or description information of a paper document as additional information upon printing and outputting that image (image data) as a paper document. When the paper document formed by recording that image is to be copied, the storage location in the image storage device that stores an original image is detected from the pointer information appended to the cover page or the like, and the original image stored in the image storage device can be directly used in an edit process and re-print process in place of the image scanned from the paper document. As a result, paper documents themselves need not be saved, and problems such as deterioration of image quality and the like due to very often re-uses of images scanned from paper documents can be prevented (for example, see patent reference 1: Japanese Patent Laid-Open No. 10-143414).

The former technique can save a paper document as a PDF file with a compact information volume. However, since the entire file is saved as one image data, it is difficult to partially retrieve and re-use a given object in the document. Therefore, in order to re-use such data, graphics, tables, and the like must be created again using application software.

The latter technique can directly access an original digital file corresponding to an output paper document, thus allowing easy re-use and re-edit processes. However, this technique cannot cope with externally acquired new documents and old paper documents whose original digital files cannot be located. Hence, upon scanning a document, if a corresponding digital file is already available, it can be efficiently retrieved. However, if no such file is available, such document must be efficiently converted into and saved as vector data to allow the next and subsequent retrieval processes.

SUMMARY OF THE INVENTION

The present invention has been proposed to solve the conventional problems, and has as its objects to provide an image processing system and image processing method, which can suitably save documents such as paper documents and the like as a format that allow easy re-use and re-edit processes.

In order to achieve the above objects, the present invention is an image processing system comprising:

scanning unit, adapted to acquire image information by scanning a document;

recognition unit, adapted to recognize features of the image information acquired by the scanning unit;

character processing unit, adapted to convert the image information acquired by the scanning unit into character codes in accordance with the feature recognized by the recognition unit;

vectorization unit, adapted to convert the image information acquired by the scanning unit into vector data in accordance with the feature recognized by the recognition unit;

image conversion unit, adapted to convert the image information acquired by the scanning unit into a predetermined image format in accordance with the feature recognized by the recognition unit;

conversion unit, adapted to convert the image information acquired by the scanning unit using at least one of the character processing unit, the vectorization unit, and the image conversion means in accordance with a property of the image information; and setting unit, adapted to set variably parameters used by the recognition unit upon recognizing the feature of the image information, wherein the conversion unit controls operations of the character processing unit, the vectorization unit, and the image conversion unit in accordance with the parameters set by the setting unit.

The image processing system according to the present invention is further comprising retrieval unit, adapted to retrieve a digital file corresponding to the image information acquired by the scanning unit from digital files held by a server, and wherein the conversion unit executes conversion based on the image information acquired by the scanning unit when the retrieval unit cannot retrieve any digital file.

According to the present invention, even when a digital file cannot be retrieved based on image information, the image information can be converted into vector data on the basis of parameters such as properties and the like designated by the user when such information is actually handled. Hence, every documents such as paper documents and the like can be handled as re-usable digital files. When the user sets parameters that do not require any block selection process, OCR process, and the like, a vectorization process progresses within the setting range while substantially skipping these processes, thus speeding up the overall process.

The image processing system according to the present invention is wherein the retrieval unit retrieves from the image information a digital file by recognizing information which is appended to the document and indicates a storage location of the digital file corresponding to the document.

According to the present invention, for example, since the storage location is recognized from image information obtained by scanning additional information (pointer information indicating the storage location) such as a two-dimensional (2D) barcode or the like, an original digital file held by the server can be easily retrieved.

The image processing system according to the present invention is wherein the retrieval unit retrieves a digital file corresponding to the document from digital files held by the server on the basis of information which is embedded in the document and is obtained from the image information.

According to the present invention, since a digital file is specified by checking if image information matches specific information (e.g., watermark information embedded by digital watermarking) of a digital file, an original digital file of even a document on which no additional information is recorded can be easily retrieved.

The image processing system according to the present invention is wherein the vectorization unit comprises:

outline conversion unit, adapted to apply outline conversion to the image information acquired by the scanning unit; and function approximation unit, adapted to execute straight-line approximation, curved-line approximation, or graphic approximation of the image information on the basis of outline data which are obtained by the outline conversion and are associated with the image information.

According to the present invention, even a graphic with an arbitrary shape or the like can be efficiently held as vector data by applying function approximation such as straight-line approximation, curved-line approximation, graphic approximation, and the like to it.

The image processing system according to the present invention is wherein the character processing unit comprises:

character recognition unit for applying a character recognition process to characters in a document; and font-conversion unit, adapted to substitute the characters by font data on the basis of a character recognition process result of the character recognition unit.

According to the present invention, since optical character recognition is applied to a text region in a document, a text part can be substituted by high-quality character font data, and a photo region in a document can be compressed and held by JPEG or the like.

The image processing system according to the present invention is wherein the conversion unit segments the image information into a plurality of objects in accordance with a recognition result of the recognition means, and independently applies a conversion process to each individual object.

According to the present invention, vector data of individual objects included in image information can be independently handled based on contents according to their properties and the like.

The image processing system according to the present invention is wherein the conversion unit further comprises format conversion unit, adapted to convert the converted object into a format that can be handled by a predetermined software application.

According to the present invention, vector data can be converted into an rtf format and svg format, and such vectorized objects can be re-used and re-edited on existing application software.

The image processing system according to the present invention is further comprising:

storage unit, adapted to store vector data converted by the conversion unit at a predetermined storage location;

generation unit, adapted to generate information associated with the storage location of the vector data as additional information; and notifying unit, adapted to notify the additional information.

According to the present invention, upon scanning a given document as a copy, a digital file can be specified from the appended additional information.

The image processing system according to the present invention is wherein the retrieval unit retrieves the digital file only when the image information of the document acquired by the scanning unit includes predetermined information.

According to the present invention, since a digital file is retrieved only when the digital file which is obtained from pointer information and corresponds to a document includes predetermined information described in the document, digital files can be retrieved more accurately than a case wherein they are retrieved based only on pointer information.

In order to achieve the above objects, the present invention is an image processing system comprising:

scanning unit, adapted to acquire image information by scanning a document;

character processing unit, adapted to convert the image information acquired by the scanning unit into character codes;

vectorization unit, adapted to convert the image information acquired by the scanning unit into vector data;

image conversion unit, adapted to convert the image information acquired by the scanning unit into a predetermined image format;

conversion unit, adapted to convert the image information acquired by the scanning unit using at least one of the character processing unit, the vectorization unit, and the image conversion unit; and setting unit, adapted to set which of the character processing unit, the vectorization unit, and the image conversion unit is to be used by the conversion unit.

According to the present invention, even when a digital file corresponding to an input document can be retrieved, if that digital file is an image file, PDF file or the like, which cannot be handled by existing document creation software for respective objects, such image information is converted into vector data. Hence, even a document like an image file or the like can be converted into re-usable vector data.

The image processing system according to the present invention is further comprising retrieval unit, adapted to retrieve a digital file corresponding to the image information acquired by the scanning unit from digital files held by a server, and wherein the conversion unit executes conversion based on the image information acquired by the scanning unit when a digital file retrieved by the retrieval unit cannot be handled by predetermined document creation software.

According to the present invention, even when no digital file corresponding to the entire image information is available, corresponding vector data are retrieved for respective parts (objects). If a corresponding object is found, it is used. If no corresponding object is found, a vectorization process need only be executed, thus speeding up the process and improving the image quality.

The image processing system according to the present invention is further comprising selection unit, adapted to select whether or not a digital file retrieval process by the retrieval unit is to be executed-irrespective of the presence/absence of a digital file corresponding to the document.

According to the present invention, the user can arbitrarily designate whether or not a retrieval process is to be executed. Hence, when the user knows in advance that no original digital file is available, or when he or she wants to convert image information into vector data irrespective of the presence/absence of its original digital file, the time required for the retrieval process can be reduced.

The image processing system according to the present invention is wherein the setting unit comprises:

first setting unit, adapted to set a property of the document to be one of text, photo, line art, and table; and second setting unit, adapted to set a parameter in one of a character recognition process, font-conversion process, font-designation process, function approximation process, and compression process upon conversion by the conversion unit.

According to the present invention, since properties of a document are designated in advance, the recognition precision in a vectorization process to be executed later can be improved. Furthermore, by designating parameters in desired processes (e.g., an OCR process, font-conversion process, font-designation process, function approximation process, compression process, and the like), the vectorization process of user's choice can be reliably done.

The image processing system according to the present invention is wherein the conversion unit switches contents of a conversion process of the image information on the basis of contents designated by one of the first and second setting unit.

According to the present invention, since the contents of the vectorization process are switched based on information designated by the user, the process can be speeded up and the precision can be improved. For example, when the user designates a text property in advance, all results of property determination of the vectorization process (property determination for respective objects segmented in block selection) can be determined as TEXT. When the user designates a photo or line art property, all results of property determination can be determined as PHOTO or LINE. By fixing the property determination result in this manner, the process in a determination unit can be skipped, and recognition errors can be avoided, thus improving the image quality. Also, the function approximation processes (straight-line approximation, curved-line approximation, graphic approximation) suited to respective properties can be set.

The image processing system according to the present invention is further comprising:
  password request unit, adapted to send an input request of authentication information from a server which holds digital files with access limitations to a user prior to acquiring a digital file from the server;
  password checking unit, adapted to check if the input authentication information is correct; and
  permission unit, when the correct authentication information is input, adapted to permit access to the digital files in the server and,
  wherein the digital file is acquired only if the permission unit permits access to the digital file.

According to the present invention, since a digital file can be acquired from a server only when authentication information such as a password or the like is consistent, handling of documents that require high secrecy is limited to only a specific user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the arrangement of an image processing system according to the first embodiment of the present invention;

FIG. 5 is a table for explaining block information of respective blocks obtained by the block selection process;

FIG. 9 is a flowchart for explaining the processing sequence for searching a server that stores digital files using pointer information including a file access right;

FIG. 19 is a flowchart for explaining the sequence for encoding a data character string as pointer information using a 2D barcode, and appending the encoded 2D barcode to an image;

DETAILED DESCRIPTION OF THE PREFERRED EMBODIMENTS

Figure 2:
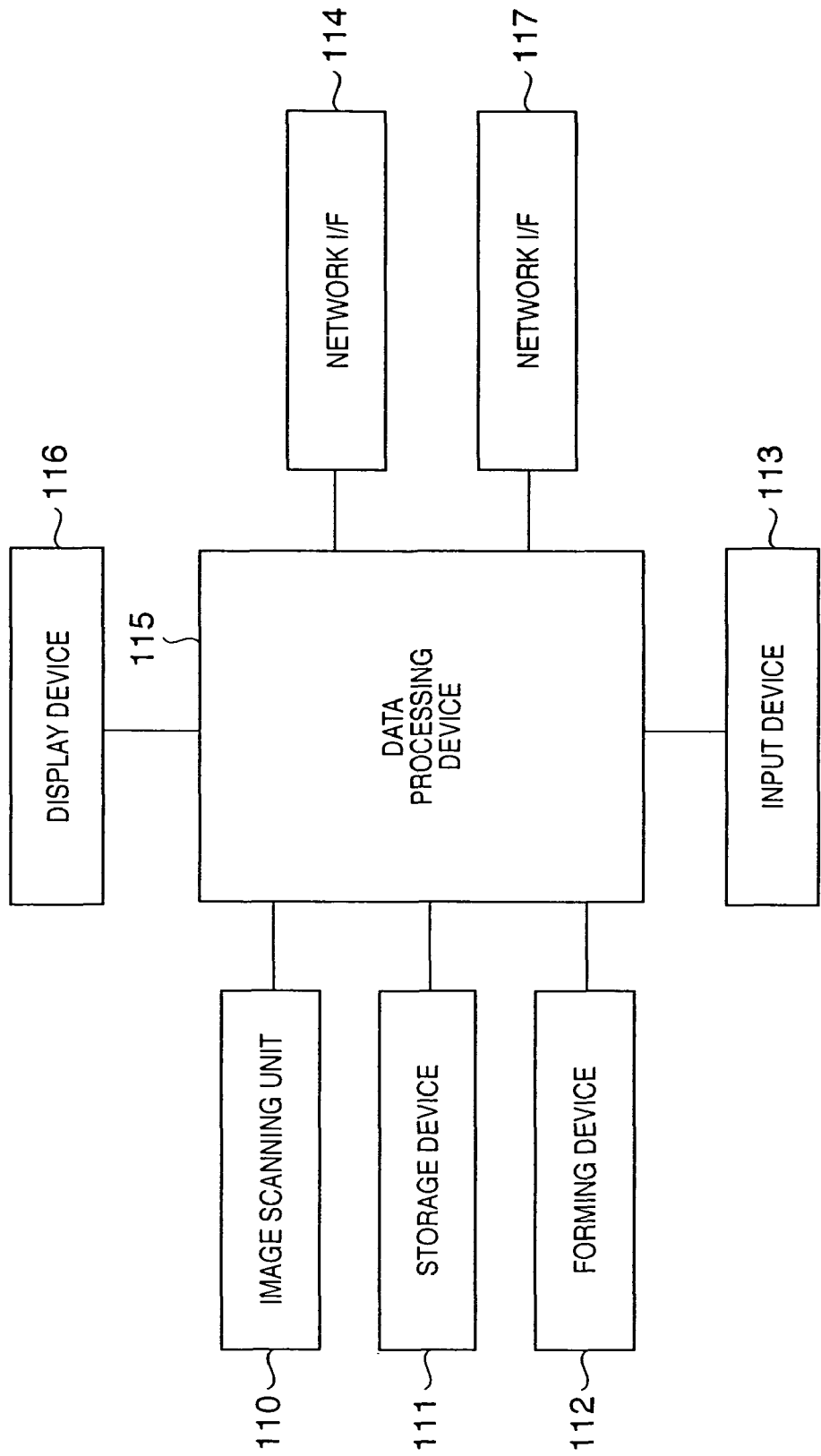
FIG. 2 is a block diagram showing the arrangement of an MFP 100 according to the first embodiment of the present invention.

Preferred embodiments of the present invention will now be described in detail in accordance with the accompanying drawings.

First Embodiment

FIG. 1 is a block diagram showing the arrangement of an image processing system according to the first embodiment of the present invention. The image processing system shown in FIG. 1 is implemented in an environment in which offices 10 and 20 are connected via an Internet 104.

To a LAN 107 formed in the office 10, an MFP 100, a management PC 101 for controlling the MFP 100, a client PC 102, a document management server 106a, its database 105a, and a proxy server 103a are connected. Also, to a LAN 108 formed in the office 20, a document management server 106b, its database 105b, and a proxy server 103b are connected. The LAN 107 and the LAN 108 in the office 20 are connected to the Internet 104 via the proxy servers 103a and 103b, respectively.

The MFP 100 in this embodiment is in charge of an image scanning process for optically scanning a paper document and converting it into aim age signal and some of image processes for the scanned image signal, and supplies the image signal to the management PC 101 via a LAN 109. Note that the management PC 101 can also be implemented by a general PC and includes an image storage unit, image processing unit, display unit, and input unit.

FIG. 2 is a block diagram showing the arrangement of the MFP 100. Referring to FIG. 2, an image scanning unit 110 including an auto document feeder (to be abbreviated as an ADF hereinafter) irradiates a document image on each of one or a plurality of stacked documents with light coming from an internal light source, forms an image of light reflected by the document on a solid-state image sensing element via a lens, and obtains a scanned image signal in the raster order as image information at a resolution of, e.g., 600 dpi, from the solid-state image sensing element. When a normal copying function is used, a data processing device 115 executes an image process of that image signal to convert it into a recording signal. In case of a multi-copying process, the data processing device 115 temporarily stores recording data for one page in a storage device 111, and sequentially outputs that data to a forming device 112, thus forming images on paper sheets.

Print data output from the client PC 102 is received by the data processing device 115 via the LAN 107 and a network I/F 114, and is then converted into recordable raster data by the data processing device 115. The raster data is then input to the forming device 112 to form a recording image on a paper sheet.

An operator's instruction is input to the MFP 100 via an input device 113 (e.g., keys and the like) equipped on the MFP 100 or an input device including a keyboard, mouse, and the like of the management PC 101. A series of operations are controlled by a controller in the data processing device 115.

On the other hand, status of operation inputs and image data whose process is underway are displayed on a display device 116 of the MFP 100 or on a monitor of the management PC 101 or client PC 102. Note that the storage device 111 is controlled from the management PC 101, and data exchange and control between the MFP 100 and management PC 101 are made via a network I/F 117 and the directly connected LAN 109.

[Processing Overview]

Figure 3:
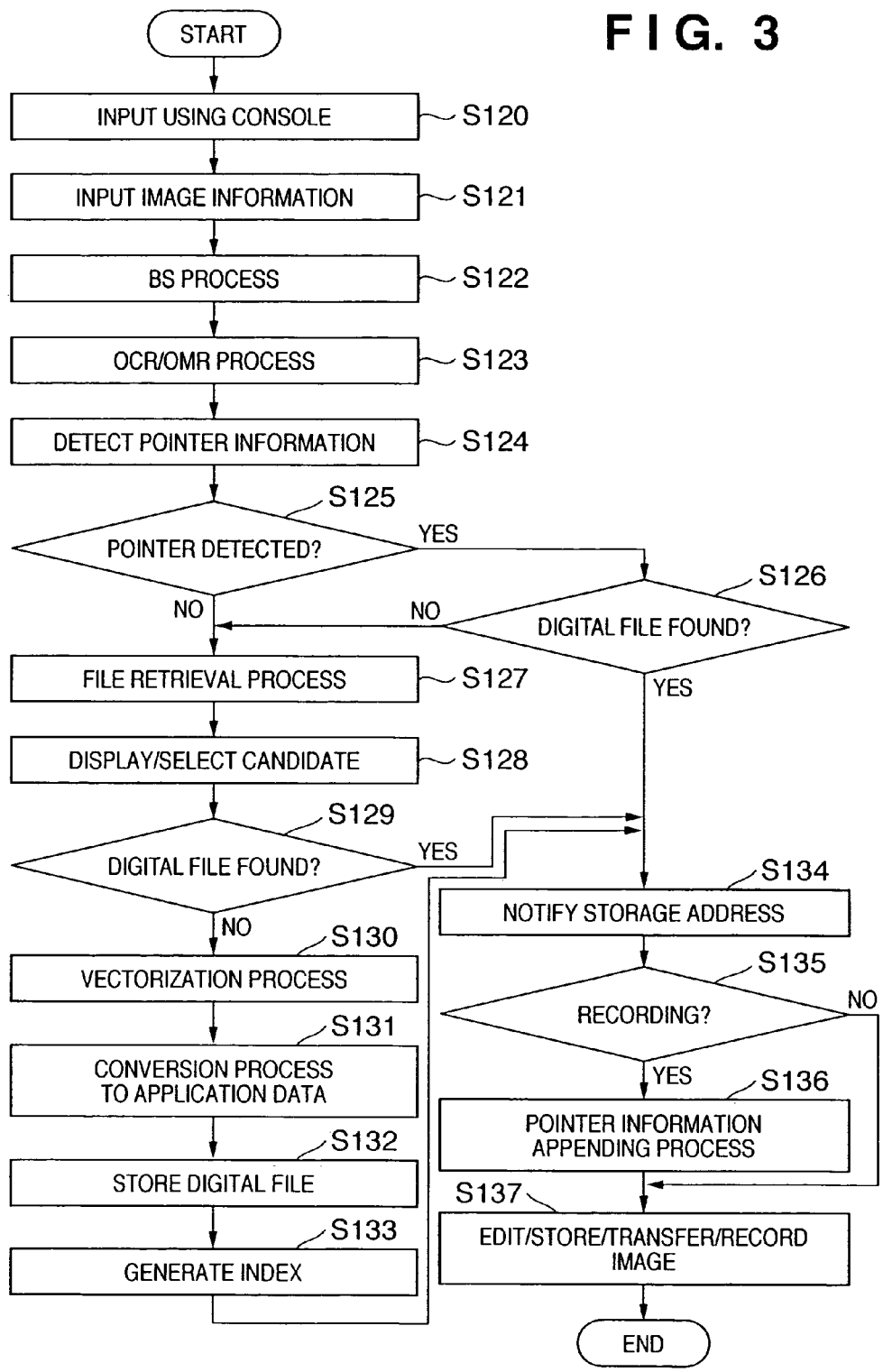
FIG. 3 is a flowchart for explaining the image processing sequence of the image processing system according to the first embodiment of the present invention.

An overview of the entire image process of the image processing system according to the embodiment of the present invention will be described below. FIG. 3 is a flowchart for explaining the image processing sequence of the image processing system according to the first embodiment of the present invention.

The user makes input operations such as various setups and the like using a console (UI) or the like of the MFP 100 (step S120). Note that details of the input operations in step S120 will be described later.

The image scanning unit 110 of the MFP 100 is enabled to scan one document in a raster order, and to obtain an 8-bit image signal of a 600 dpi (an image information input process: step S121). Note that this image signal undergoes a pre-process by the data processing device 115, and is saved as image data for one page in the storage device 111.

A CPU of the management PC 101 separates regions of a text/line art part and halftone image part from the image signal stored in the storage device 111. The CPU further separates a text part into blocks combined as clusters for respective paragraphs, and a line art part into tables and graphics formed of lines, and converts these tables and graphics into segments. On the other hand, the CPU separates an image part expressed by halftone and segments such image part into independent objects for respective blocks of an image part, background part, and the like (BS process: step S122).

At this time, an object corresponding to a 2D barcode or URL, which is recorded in the document image as additional information, is detected. In this case, the URL undergoes an OCR process (optical character recognition process) or the 2D barcode or the object is decoded (step S123).

Then, pointer information in the storage device that stores an original digital file of a document is detected (step S124). As means for appending pointer information, a method of embedding information in the spacings between neighboring characters, a method of embedding information in a halftone image, or the like may be adopted in addition to the above method. If additional information is embedded as a digital watermark, watermark information is detected and decoded in step S125.

It is checked if the pointer information is detected (step S125). If the pointer information is detected (Yes in step S125), a digital file corresponding to the document is retrieved from the address designated by the pointer, thus specifying the file (step S126). The digital file is stored in one of a hard disk in the client PC 102, the databases 105a and 105b in the document management servers 106a and 106b connected to the LANs 107 and 108 in the offices 10 and 20, and the storage device 111 of the MFP 100 itself in FIG. 1, and the digital file is retrieved from these storage devices in accordance with the address information obtained in step S125.

If no digital file is found (No in step S126) or if the found file is a so-called image file represented by JPEG or tiff in step S126 (i.e., in case of an image file which is hardly re-used or re-edited by existing document creation software or the like), the flow branches to step S127. If no pointer information itself is found (No in step S125), the flow also branches to step S127.

Step S127 is a so-called document retrieval process routine. A full-text retrieval process is conducted by extracting words from the results of the OCR process which is executed for text blocks in step S123, and comparing them with words contained in a digital file, or a so-called layout retrieval process is conducted based on the layout and properties of respective objects. As a result of the retrieval process, if a digital file with a high similarity level is found, it is displayed as a thumbnail or the like (step S128). If a plurality of digital files are retrieved, and an operator's choice must be made, a file is specified by an operator's input operation. If only one file is found as a candidate, the flow automatically branches from step S129 to step S134 to notify the storage address of the candidate file.

If no digital file is found by the retrieval process in step S127, or if the found file is a so-called image file represented by JPEG or tiff, the flow branches to step S130 to execute a vectorization process.

In step S130, a conversion process from raster image data into vector data is executed to obtain a digital file which is approximate to an original digital file, is easily editable, and has a small file size. That is, the character type, and the size, style, font, and the like of characters are recognized based on text blocks that has undergone the OCR process in step S123 to be converted into font data which are visually faithful to characters obtained by scanning the document, thus converting the text blocks into character codes (character codes and codes indicating the size, style, and font are associated with font data). On the other hand, line art, table, or graphic blocks formed of lines and curves undergo outline conversion and function approximation (straight-line approximation, curved-line approximation, graphic approximation, and the like). Furthermore, each image block is processed as an independent JPEG file or the like by compressing image data.

Note that the process including character code conversion and compression of image data has been explained as the conversion process into vector data. However, some documents do not include any data to be vectorized (e.g., a document of only photos and a document of only text). In this case, the processes for converting objects into formats according to the properties (text, line art, natural image, and the like) of images will be referred to as the vectorization processes.

Note that these vectorization processes are done for respective objects, and layout information of the objects is saved. These objects and layout information are converted into application data (e.g., rtf, svg, or the like) (step S131). The converted file is stored in the storage device 111 or the like as a digital file (step S132).

Index information for retrieval is generated for the vectorized document image so that the document image can be directly retrieved as a digital file upon executing the subsequent processes (step S133), and is added to a retrieval index file. Then, the operator (client) is notified of the storage address (step S134).

Furthermore, it is checked if the process to be done by the operator is a recording process (step S135). If the process to be done by the operator is a recording process (Yes in step S135), the flow branches to step S136 to append pointer information to a file as image data.

On the other hand, if the digital file can be specified in the retrieval process, the flow similarly branches from step S129 to step S134 to notify the client of the storage address (step S134). If the file is to be recorded on a medium such as a paper sheet, pointer information is similarly appended to the digital file (step S136).

Note that a text modification process and image edit, storage, transfer, and recording processes can be easily executed in step S137 using the digital file itself acquired by this embodiment.

The aforementioned processes not only allow easier re-use and re-edit of the acquired digital file than in a case wherein image data is acquired as it is, but also can improve the storage efficiency and shorten the transfer time since the information volume is reduced. In addition, the digital file is used as high-quality data when it is recorded or displayed.

Respective processing blocks will be described in detail below.

[Input Operation]

Figure 20:
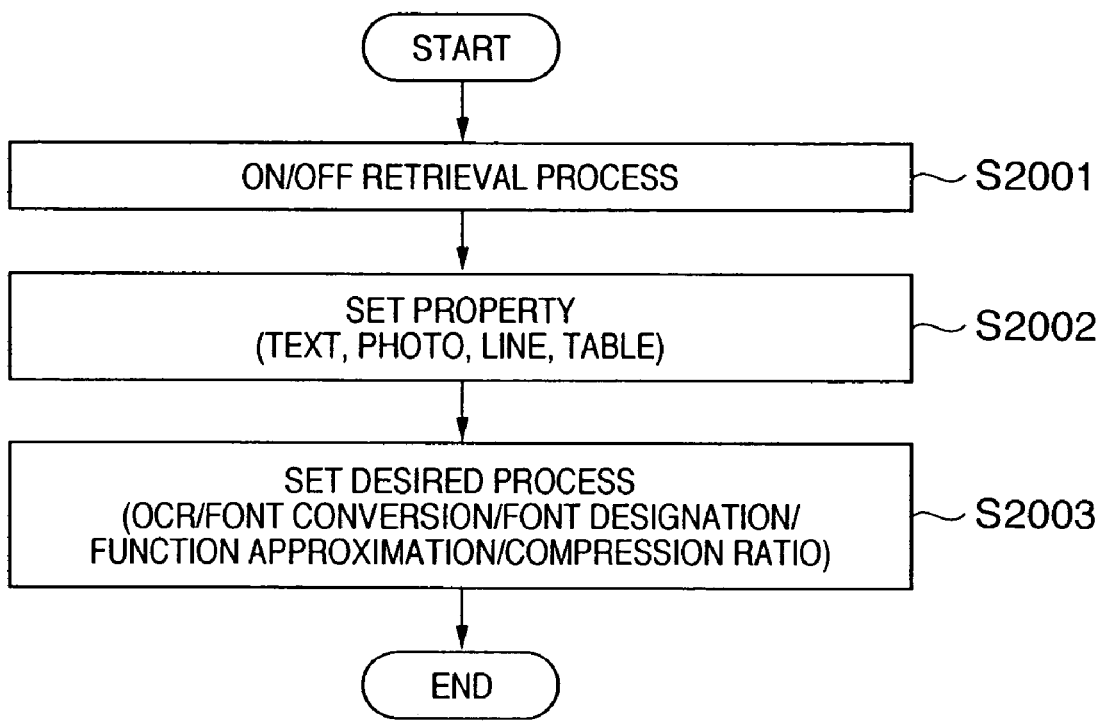
FIG. 20 is a flowchart for explaining details of the sequence of the input operation in step S120.

The input operation made in step S120 will be described below. FIG. 20 is a flowchart for explaining the sequence of the input operation in step S120 in detail. The user sets using a console (UI) such as the input device 113 or the like of the MFP 100 whether or not a retrieval process (specifying process) for acquiring a digital file based on pointer information appended to a document is to be done (ON/OFF) (step S2001). This setup is used when it is recognized in advance that no original digital file designated by the pointer information is not stored in the database (file server) to be retrieved. Alternatively, even when it is recognized that a digital file designated by the pointer information is stored, if the user does not insist on that digital file, it is desirable to turn off the retrieval process setup in terms of the processing time. Therefore, this embodiment prompts the user to select whether or not the specifying process is to be executed.

Then, the user sets modes (e.g., text, photo, line art, table, and the like) indicating the properties of a document to be scanned. A plurality of properties can be selected in step S2002. For example, "text (Text)" is selected for a text document. Therefore, the result of the block selection process in step S122 is limited to the Text property.

Also, for a document which includes both text and line art parts, "text" and "line art (Line)" properties are selected. Therefore, the results of the block selection process in step S122 are limited to two types of properties, i.e., Text and Line.

These properties are selected as follows: for example, buttons such as "text", "table", "photo", "text/line art", "text/photo", and the like are provided to the console, and the operator presses one of these buttons upon scanning a document. Upon execution of block selection, whether or not a block of interest has the designated property is recognized. That is, a property determination parameter (a parameter indicating a property to be recognized) is changed in accordance with the designated property. If it is determined that the block of interest does not have the designated property, it is handled as an image (or background) or the absence of data.

The user must determine such properties by observing a document. However, when the user designates properties, the block selection process except for the designated properties can be skipped. When the designated properties do not include any text property, the OCR process can be skipped; when they do not include any line art or graphic property, the function approximation process can be skipped. Hence, the results of the block selection process can be obtained based on the designated properties, thus speeding up the process and assuring high image quality. Since the operator designates properties, the number of properties to be checked in the block selection process can be reduced, thus eliminating checking errors.

In the above description, whether or not the block of interest has the designated property is determined based on the designated property upon determination of the properties of the scanned document. Alternatively, the determination processes of all properties may be executed. In this case, the determination logic may be modified so that only the designated property is more likely to be determined.

That is, the logic is modified to preferentially select the designated property upon selecting one of a plurality of properties in the block selection process.

The user then sets other processes (the OCR process, font-conversion process, font-designation process, function approximation process, setting process of a compression ratio for the compression process, and the like) of his or her choice (step S2003).

As for the setup associated with the OCR process, the user designates whether or not the OCR process is to be executed. If the user designates that the OCR process is to be executed, the OCR process is applied to blocks which have the determination result "Text" of the block selection process. As for the setup associated with the font-conversion process, the user designates whether or not a process for substituting the font of text by font data visually faithful to that in the document using the OCR process result is to be executed. Furthermore, as for the setup of the font-designation process, the user designates whether or not a process for substituting the font of text by a font of his or her choice irrespective of that in the document is to be executed. Moreover, as for the setup for the function approximation process, the user sets whether or not function approximation (straight-line approximation, curved-line approximation, graphic approximation, and the like) is applied to blocks which have the determination results "Text", "Line", and "Table (table)." of the block selection process. In addition, as for the setup of the compression ratio, the user sets the compression ratio upon applying JPEG compression or the like to blocks which have the determination result "Photo" of the block selection process.

Note that the properties to be set and other processes to be set are not limited to those described above, but other parameters may be similarly set. After the aforementioned parameters and the like are set, the input operation process (step S120) ends.

The block selection (BS) process in step S122 will be described below.

[Block Selection Process]

Figure 4:
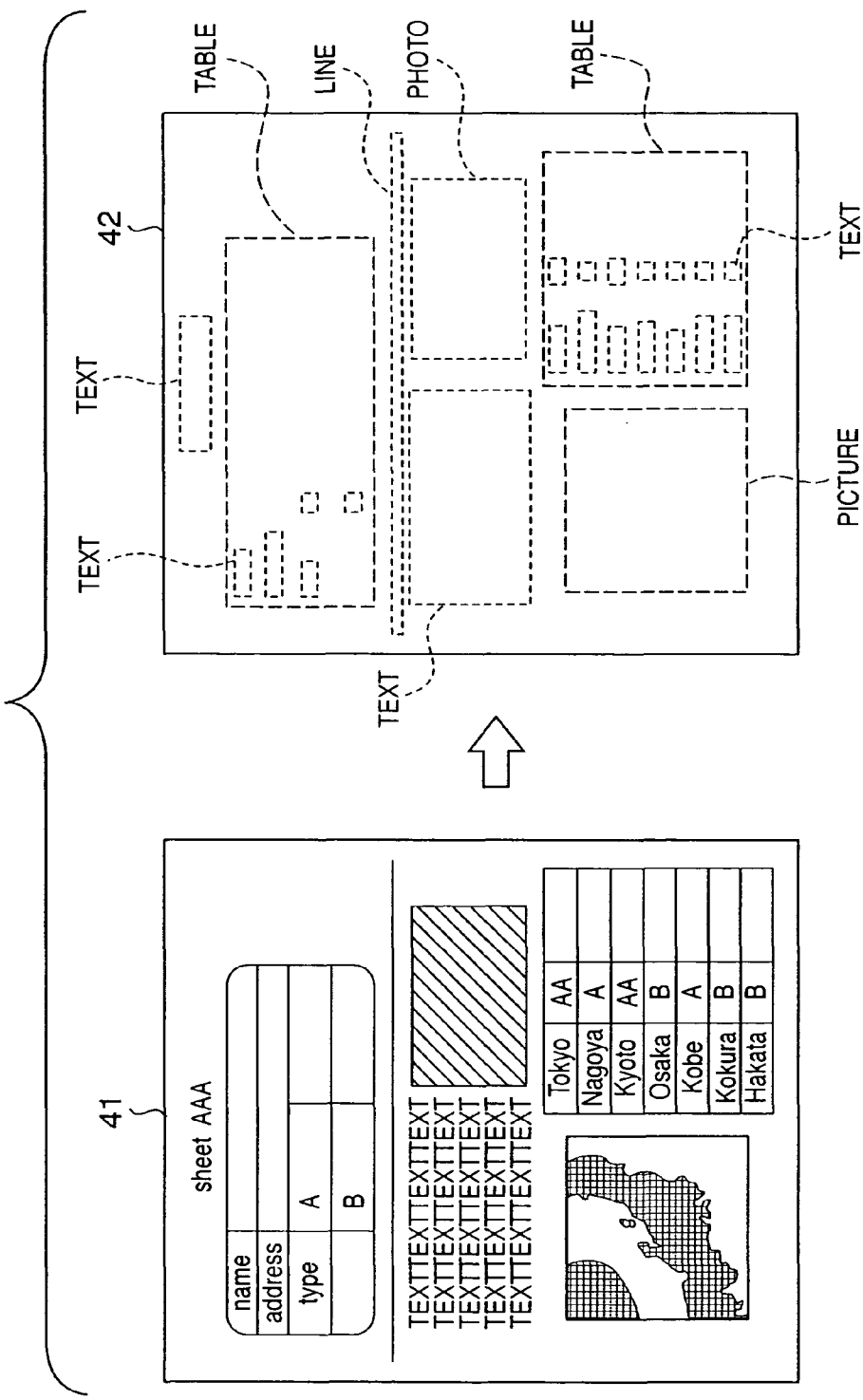
FIG. 4 depicts a state wherein scanned image data for one page is segmented into a plurality of blocks by a block selection process by determining their properties.

FIG. 4 depicts a state wherein scanned image data for one page is segmented into a plurality of blocks by the block selection process by determining their properties. More specifically, the block selection process is a process for recognizing image data 41 for one page scanned in step S121 as clusters 42 for respective objects, and determining the properties such as text (Text), photo (Photo), line (Line), table (Table), and the like of respective blocks, and segmenting the image data into regions (blocks) having different properties.

An embodiment of the block selection process will be described below.

An input image is binarized to a monochrome image, and a cluster of pixels bounded by black pixels is extracted by outline tracing. For a cluster of black pixels with a large area, outline tracing is made for white pixels in the cluster to extract clusters of white pixels. Furthermore, a cluster of black pixels is recursively extracted from the cluster of white pixels with a predetermined area or more. Note that the above process corresponds to a process to be executed for a document on which black characters or the like are printed on a white background. In case of other documents, the process can be similarly made by setting a color corresponding to a background as "white" and that corresponding to an object as "black".

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a low-profile pixel cluster is categorized as a line region, a range occupied by black pixel clusters that include rectangular white pixel clusters which regularly line up is categorized as a table region, a region where pixel clusters with indeterminate forms are distributed is categorized as a photo region, and other pixel clusters with an arbitrary shape is categorized as a graphic region, and so forth.

Note that processes for some properties are skipped or the priority levels of respective properties to be determined are changed in accordance with properties designated by the operator in the aforementioned property determination process.

FIG. 5 shows an example of block information for respective blocks obtained by the block selection process. Information for each block shown in FIG. 5 is used as that for the vectorization process and retrieval process to be described later.

[Detection of Pointer Information from Image Data]

The OCR/OMR process for extracting the storage location of the digital file from scanned image data in step S123 will be described below.

Figure 6:
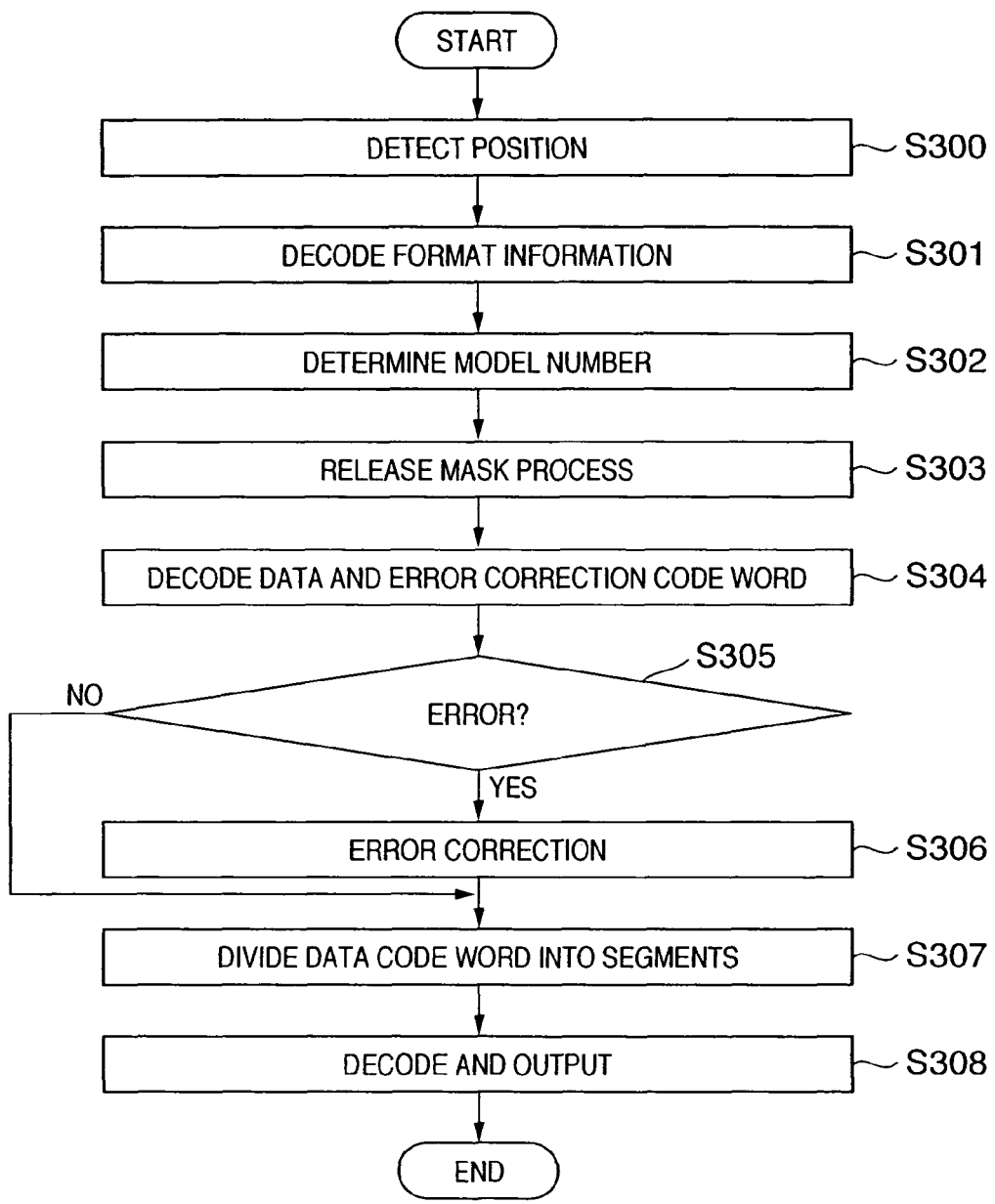
FIG. 6 is a flowchart for explaining the sequence for decoding a 2D barcode (QR code symbol) appended to a document image and outputting a data character string.
Figure 7:
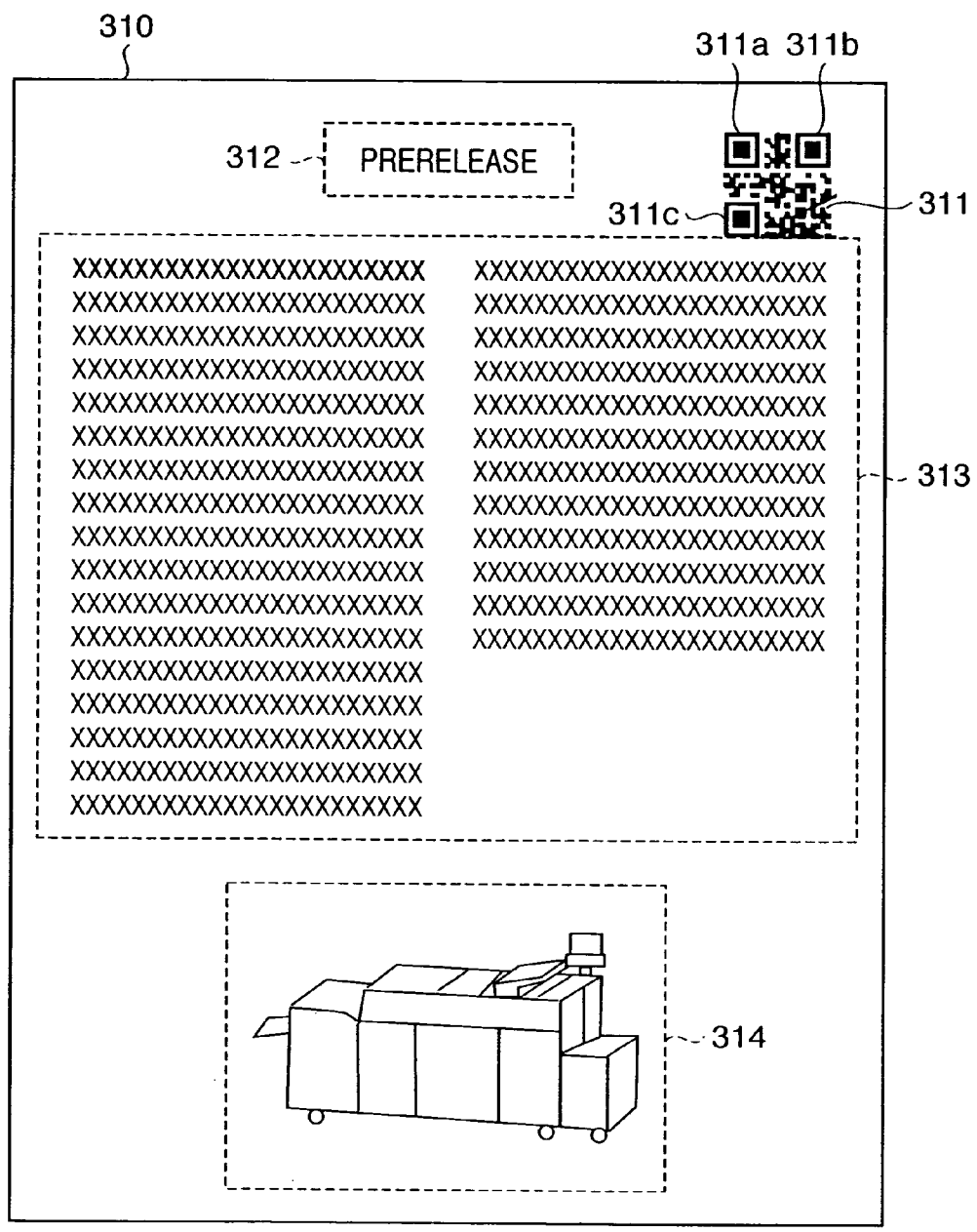
FIG. 7 shows an example of a document 310 to which the 2D barcode symbol is appended.

FIG. 6 is a flowchart for explaining the sequence for decoding a 2D barcode (QR code symbol) appended into the document image and outputting a data character string. FIG. 7 shows an example of a document 310 appended with the 2D barcode.

The internal CPU scans image data which is stored in a page memory in the data processing device 115 and is obtained by scanning the document 310 to detect the position of a predetermined 2D barcode symbol 311 from the result of the aforementioned block selection process. A position detection pattern of a QR code is made up of identical position detection element patterns 311a to 311c, which are located at three out of the four corners of the symbol (step S300).

Next, format information that neighbors the position detection pattern is decoded to obtain an error correction level and mask pattern applied to the symbol (step S301). After a model number of the symbol is determined (step S302), an encoded region bit pattern is XORed using the mask pattern obtained from the format information to release the mask process (step S303).

A symbol character is read in accordance with the layout rule corresponding to the model so as to decode message data and an error correction code word (step S304). It is detected if a decoded code includes an error (step S305). As a result, if any error is detected (Yes in step S305), that error is corrected (step S306). A data code word is divided into segments on the basis of a mode indicator and character count indicator from the error-corrected data (step S307). Finally, data characters are decoded on the basis of a specification mode, thus outputting the result (step S308). If no error is detected in step S305, the flow jumps to step S307.

Note that data to be encoded in the 2D barcode represents server address information (pointer information) where the corresponding file is stored, which information is formed of path information including an IP address indicating a file server name and server address, a corresponding URL, or the like.

In this embodiment, the document 310 appended with the pointer information using the 2D barcode has been exemplified. Alternatively, pointer information may be recorded using a character string. In this case, a block of a character string according to a predetermined rule is detected by the above block selection process, and characters of the character string that indicates the pointer information undergo character recognition, thus obtaining the server address information of the server that stores the original digital file.

Furthermore, pointer information can be assigned by embedding watermark information in the character spacings by applying imperceptible modulation to, e.g., the spacings between neighboring characters in a character string of a text block 312 or 313 of the document 310 shown in FIG. 7. When such watermark information is used, pointer information can be acquired by detecting the character spacings upon executing a character recognition process (to be described later). Also, pointer information can be assigned as a digital watermark in a natural image block 314.

[File Retrieval Based on Pointer Information]

Figure 8:
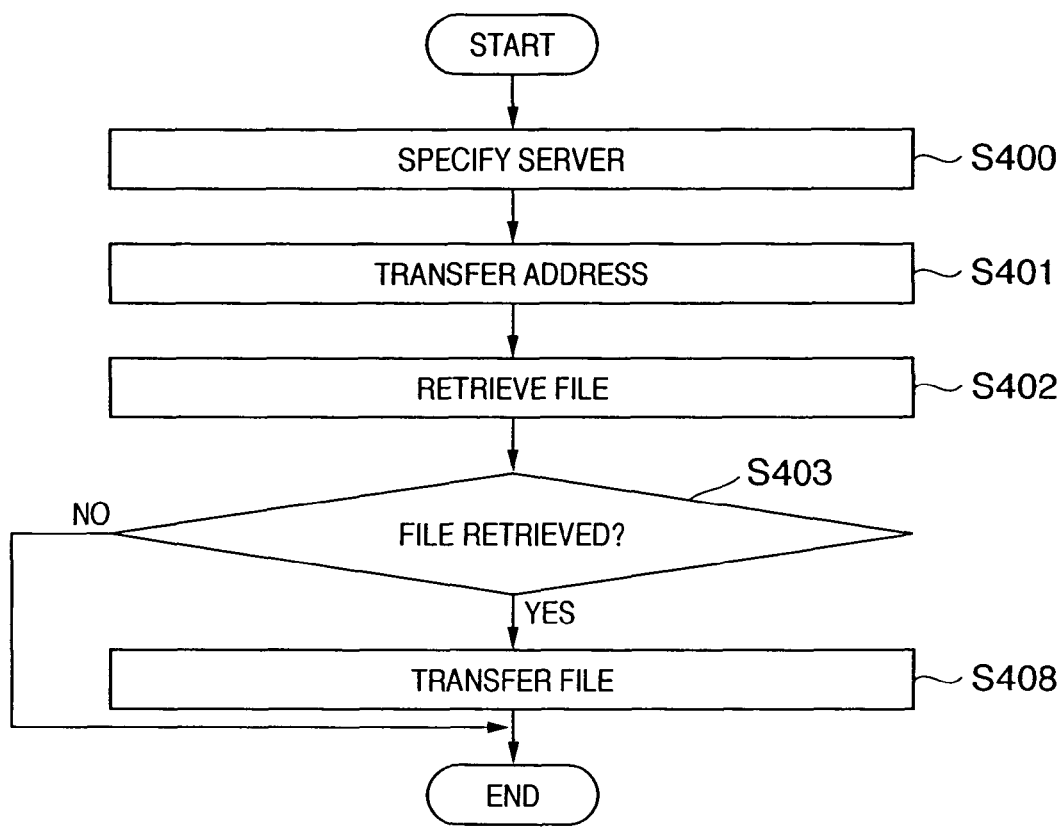
FIG. 8 is a flowchart for explaining the processing sequence for searching a server that stores digital files using detected pointer information.

The retrieval process of the server that stores digital files using the pointer information in steps S126 and S129 in FIG. 3 will be described in detail below. FIG. 8 is a flowchart for explaining the processing sequence for searching the server that stores digital files using the detected pointer information.

A file server that stores a digital file of interest is specified based on a server address included in the pointer information (step S400). Note that the file server indicates the client PC 102, the document management servers 106a and 106b that incorporate the databases 105a and 105b, or the MFP 100 itself that incorporates the storage device 111. Also, the address is a URL or path information including a URL or server name.

After the file server is specified, the control requests the file server to make preparation required to search the server (file server) designated by the pointer information in step S127 described using FIG. 3 (step S401). The file server retrieves the digital file of interest according to the file retrieval process in step S128 (step S402). It is checked if the digital file is found (step S403).

As a result, if no digital file is found (No in step S403), the control notifies the MFP 100 of a message that advises accordingly. On the other hand, if the digital file is found (Yes in step S403), candidates are displayed to execute the processes in steps S129 to S133, as has been described above using FIG. 3. After that, the address of the digital file of interest is notified, and that digital file is transferred to the user (i.e., the MFP 100) (step S408).

[File Retrieval Process]

Figure 10A:
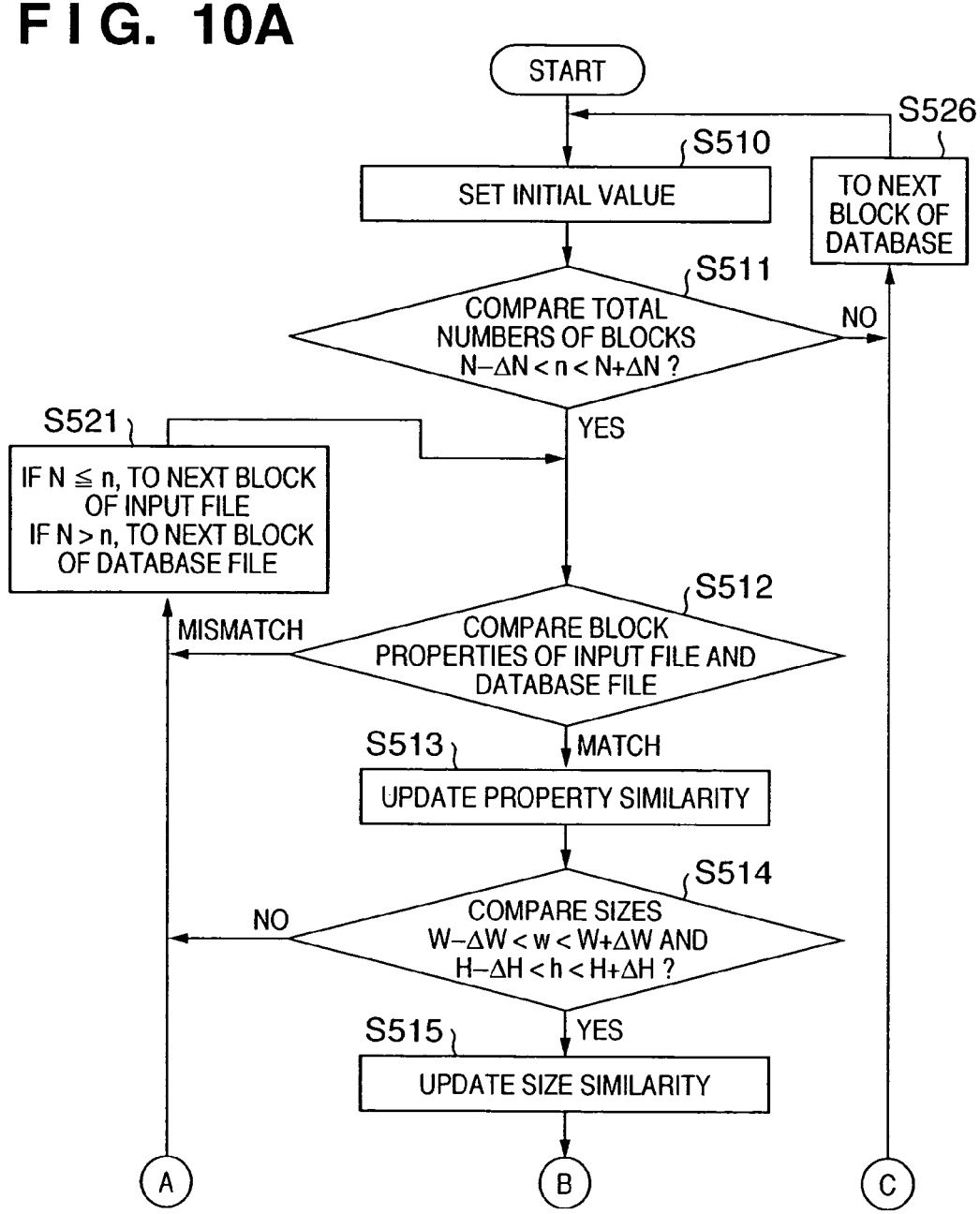
FIGS. 10A and 10B are flowcharts for explaining the layout retrieval sequence of a digital file which is similar to an input image file from a database.
Figure 10B:
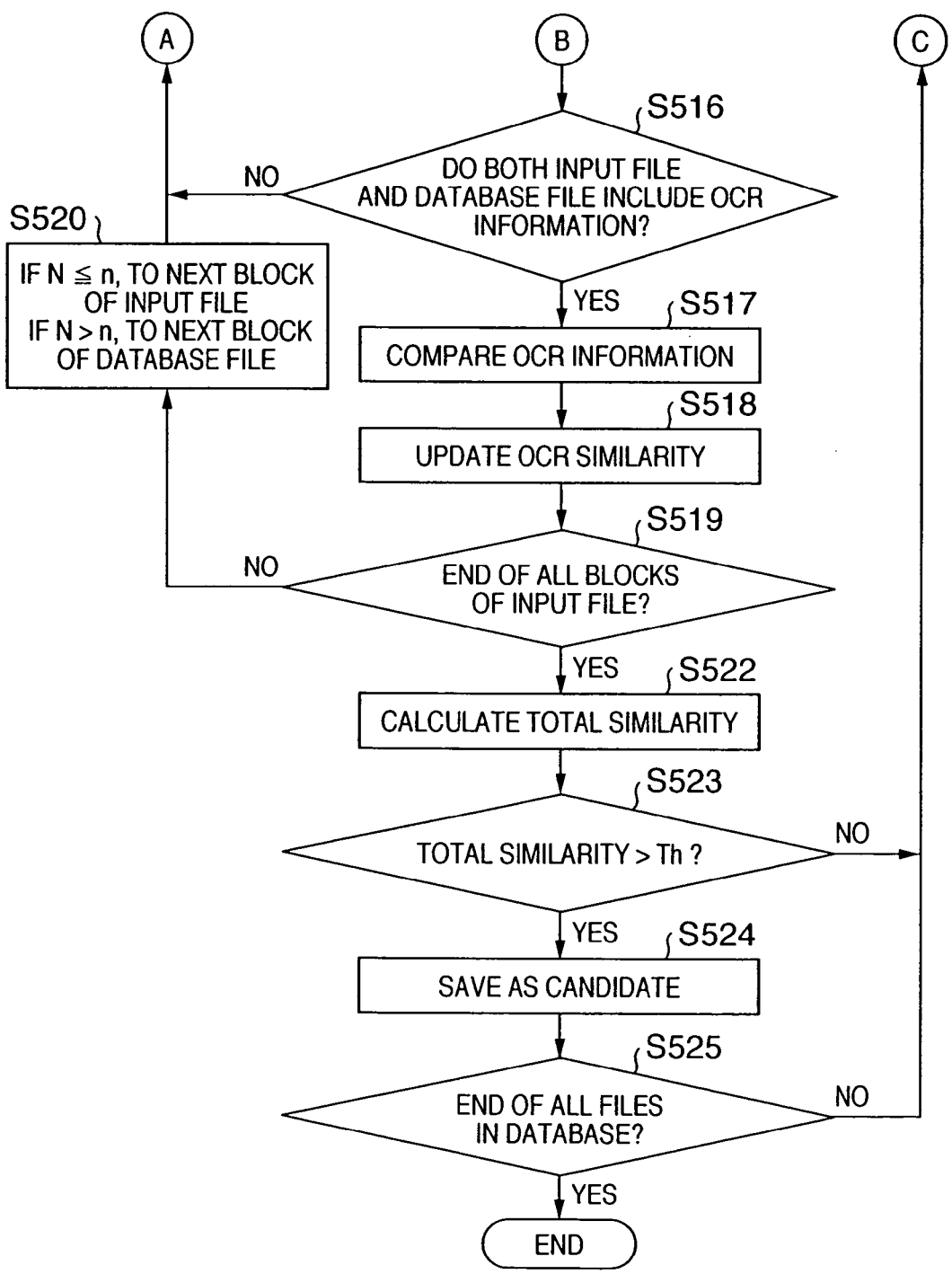

The file retrieval process in step S127 in FIG. 3 will be described in detail below using FIGS. 5 and 10A, 10B. The process in step S127 is done if an input document (input file) has no pointer information, if pointer information is available but no digital file is found or if a digital file is an image file in step S125.

Assume that blocks and an input file extracted as a result of the OCR/OMR process in step S123 have information (block information, input file information) shown in FIG. 5. In this embodiment, as the information contents, a property, coordinate position, width and height as a size, and availability of OCR information are used, as shown in FIG. 5.

The properties are categorized into text, line, photo, picture, table, and the like. For the sake of simplicity, respective blocks are respectively named as blocks 1, 2, 3, 4, 5, and 6 in ascending order of coordinate X (e.g., X1<X2<X3<X4<X5<X6) in FIG. 5. The total number of blocks indicates that of those included in an input file, and is 6 in FIG. 5. The layout retrieval sequence for searching the database for digital files similar to an input image file will be explained below. FIGS. 10A and 10B are flowcharts for explaining the layout retrieval sequence for searching the database for digital files similar to an input image file. Assume that files stored in the database have the same kinds of information as those in FIG. 5. In the flow of the flowchart shown in FIGS. 10A and 10B, the digital file scanned from an input document is compared in turn with digital files in the database.

Similarity levels and the like (to be described later) are initialized to set initial values (step S510). The total numbers of blocks are compared (step S511). If YES in step S511, respective pieces of information of blocks in files are compared in turn (step S512). That is, it is checked if the number n of blocks of each file in the database falls within the range of an error ΔN of the number N of blocks of the input file. If n falls within the error range, "true" (Yes) is determined; otherwise, "false" (No) is determined. In step S512, block properties of the input file and each database file are compared. If the two properties match, the flow advances to comparison processes in step S513 and subsequent steps; otherwise, the flow advances to step S521.

Upon comparing information of blocks, property, size, and OCR similarity levels are respectively calculated in steps S513, S515, and S518, and a total similarity level is calculated based on these levels in step S522. Since a method of calculating each similarity level can use a known technique, a description thereof will be omitted.

It is checked in step S523 if the total similarity level is higher than a pre-set threshold value Th. If the total similarity level is higher than the threshold value (Yes in step S523), that digital file is determined as a similar candidate and is saved (step S524). In FIGS. 10A and 10B, N, W, and H are respectively the total number of blocks, each block width, and each block height in an input file, and ΔN, ΔW, and ΔH are values which consider errors with reference to the block information of the input file. Also, n, w, and h are respectively the total number of blocks, each block width, and each block height in a file stored in the database. Note that position information X, position information Y, and the like may be compared upon comparing sizes in step S514.

As a result of the aforementioned retrieval process, database files which have total similarity levels higher than the threshold value Th and are saved as candidates are displayed as thumbnails or the like (step S128). If the operator must select one of a plurality of candidates, a file is specified by the operator's input operation.

[Vectorization Process]

If no original digital file is stored in the file server or if the retrieval process=OFF is selected in the input operation in step S120, image data shown in FIG. 4 is vectorized for each block. The vectorization process (step S130) in FIG. 3 will be described in detail below.

Character Recognition

As described above, when the user designates the OCR process=ON in the input operation in step S120, respective characters in a text block undergo a character recognition process. In the character recognition process of this embodiment, an image extracted for each character is recognized using one of pattern matching methods to obtain a corresponding character code. In this recognition process, an observation feature vector obtained by converting a feature acquired from a character image into a several-ten-dimensional numerical value string is compared with a dictionary feature vector obtained in advance for each character type, and a character type with a shortest distance is output as a recognition result. Note that various known methods are available for feature vector extraction. For example, a method of dividing a character into a mesh pattern, and counting character lines in respective meshes as line elements depending on their directions to obtain a (mesh count)-dimensional vector as a feature is known.

When a text region extracted by the block selection process (step S122) undergoes character recognition, the writing direction (horizontal or vertical) is determined for that region, lines are extracted in the corresponding directions, and character images are then obtained by extracting characters. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region.

Upon decomposition into character strings and characters, in case of horizontal writing, lines are extracted using the horizontal projection, and characters are extracted based on the vertical projection for the extracted line. In case of a vertical writing text region, the relationship between the horizontal and vertical parameters may be exchanged. Note that a character size can be detected based on the extracted size.

Font Recognition

A plurality of sets of dictionary feature vectors for the number of character types used in character recognition are prepared in correspondence with character shape types, i.e., font types, and a font type is output together with a character code upon matching, thus recognizing the font of a character.

Vectorization of Character

Using a character code and font information obtained by the character recognition and font recognition, and outline data prepared by an outline-conversion process, information of a character part is converted into vector data. If an original document is a color document, the color of each character is extracted from the color image and is recorded together with vector data. With the above processes, image information which belongs to a text block can be converted into vector data with a nearly faithful shape, size, and color.

Vectorization of Non-Text Part

For a region which is determined as a line art or line, or table region by the block selection process in step S122, outlines of pixel clusters extracted in each region of interest are converted into vector data. More specifically, a point sequence of pixels which form an outline is divided into sections at a point which is considered as a corner, and each section is approximated by a partial line or curve. Note that "corner" means a point corresponding to a maximal curvature.

Figure 11:
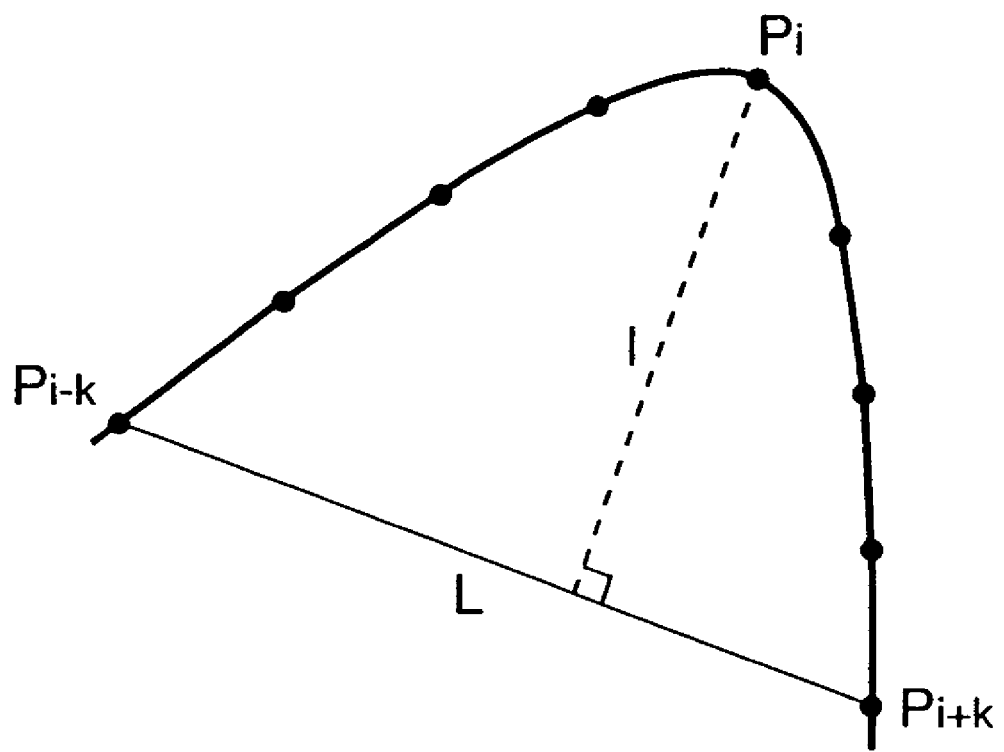
FIG. 11 is a view for explaining a point with a maximal curvature.

FIG. 11 is a view for explaining the point corresponding to the maximal curvature. As shown in FIG. 11, the point corresponding to the maximal curvature is obtained as a point where the distance between an arbitrary point Pi and a chord which is drawn between points Pi−k and Pi+k separated k points from the point Pi in the left and right directions becomes maximal. Furthermore, let R be the chord length/arc length between Pi−k and Pi+k. Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted by the block selection process.

As described above, using partial line approximation of outlines, an outline of a graphic with an arbitrary shape can be converted into vector data. When an original document has a color image, the color of a graphic is extracted from the color image and is recorded together with vector data.

Figure 12:
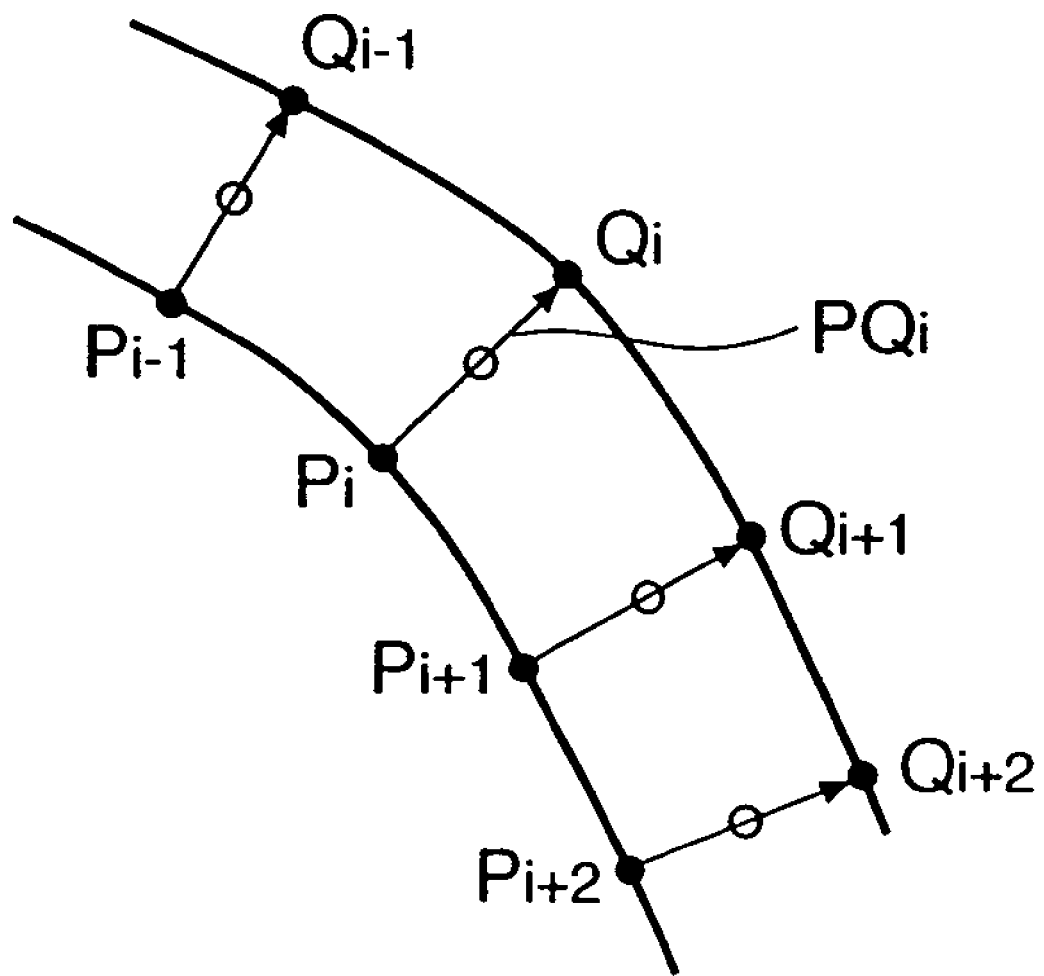
FIG. 12 is a view for explaining an example wherein an outside outline which is close to an inside outline or another outside outline is expressed as a line with a given width.

FIG. 12 is a view for explaining an example wherein an outside outline which is close to an inside outline or another outside outline is expressed as a line with a given width. When an outside outline is close to an inside outline or another outside outline in a given section, as shown in FIG. 12, two outlines may be combined to express a line with a given width. More specifically, lines are drawn from respective points Pi on a given outline to points Qi on another outline, each of which has a shortest distance from the corresponding point. When the distances PQi maintain a constant value or less on the average, the section of interest is approximated by a line or curve using PQi middle points as a point sequence, and the average value of the distances PQi is set as the width of that line or curve. A line or a table ruled line as a set of lines can be efficiently expressed as vector data as a set of lines having a given width, as described above.

As for vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. Therefore, in the present invention, such character is handled in the same manner as a general line art, as described above, and is converted into outline data. That is, even a character that causes a recognition error in the conventional character recognition process can be prevented from being vectorized to a wrong character, but can be vectorized based on outline data which is visually faithful to image data. Also, a block determined as a photo block is not vectorized in the present invention, and is output as image data without any modification or is compressed based on the compression ratio designated in the input operation in step S120.

<<Graphic Recognition>>

A process for grouping vectorized partial lines for each graphic object after the outline of a graphic with an arbitrary shape is vectorized, as described above, will be described below.

Figure 13:
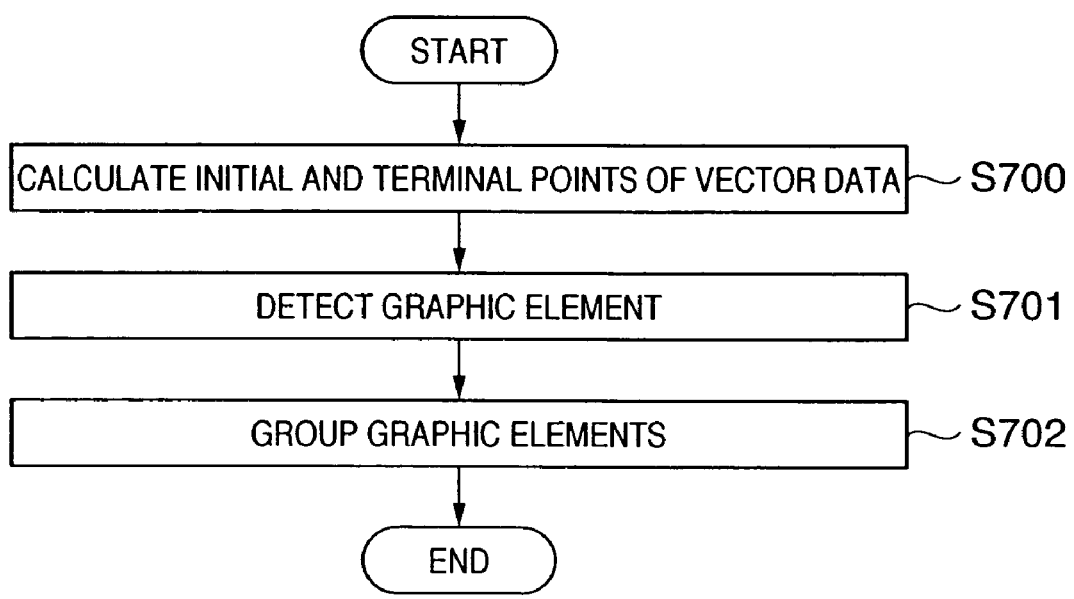
FIG. 13 is a flowchart for explaining the processing sequence executed until vector data are grouped for each graphic object.

FIG. 13 is a flowchart for explaining the processing sequence executed until vector data are grouped for each graphic object. Initial and terminal points of each vector data are calculated (step S700). Using the initial point information and terminal point information of respective vectors, a graphic element is detected (step S701). Detecting a graphic element is to detect a closed graphic formed by partial lines. Such detection is made by applying the principle that each vector which forms a closed shape has vectors coupled to its two ends.

Next, other graphic elements or partial lines present in the graphic element are grouped to set a single graphic object (step S702). If other graphic elements or partial lines are not present in the graphic element, that graphic element is set as a graphic object.

Figure 14:
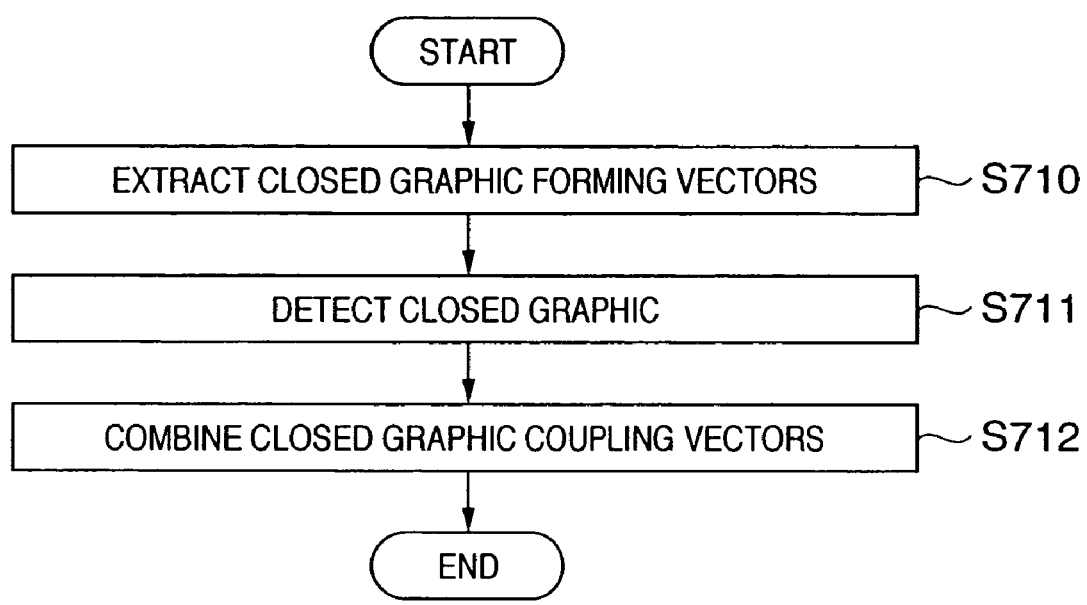
FIG. 14 is a flowchart for explaining the processing sequence for detecting graphic elements.

FIG. 14 is a flowchart for explaining the processing sequence for detecting a graphic element. Closed graphic forming vectors are extracted from vector data by excluding unwanted vectors, two ends of which are not coupled to other vectors (step S710). An initial point of a vector of interest of the closed graphic forming vectors is set as a start point, and vectors are traced clockwise in turn. This process is made until the start point is reached, and all passing vectors are grouped as a closed graphic that forms one graphic element (step S711). Also, all closed graphic forming vectors present in the closed graphic are grouped in this case. Furthermore, an initial point of a vector which is not grouped yet is set as a start point, and the above process is repeated. Finally, of the unwanted vectors excluded in step S710, those which join the vectors grouped as the closed graphic in step S711 are detected and are grouped as one graphic element (step S712).

With the above process, a graphic block can be handled as an independently re-usable graphic object.

Figure 21:
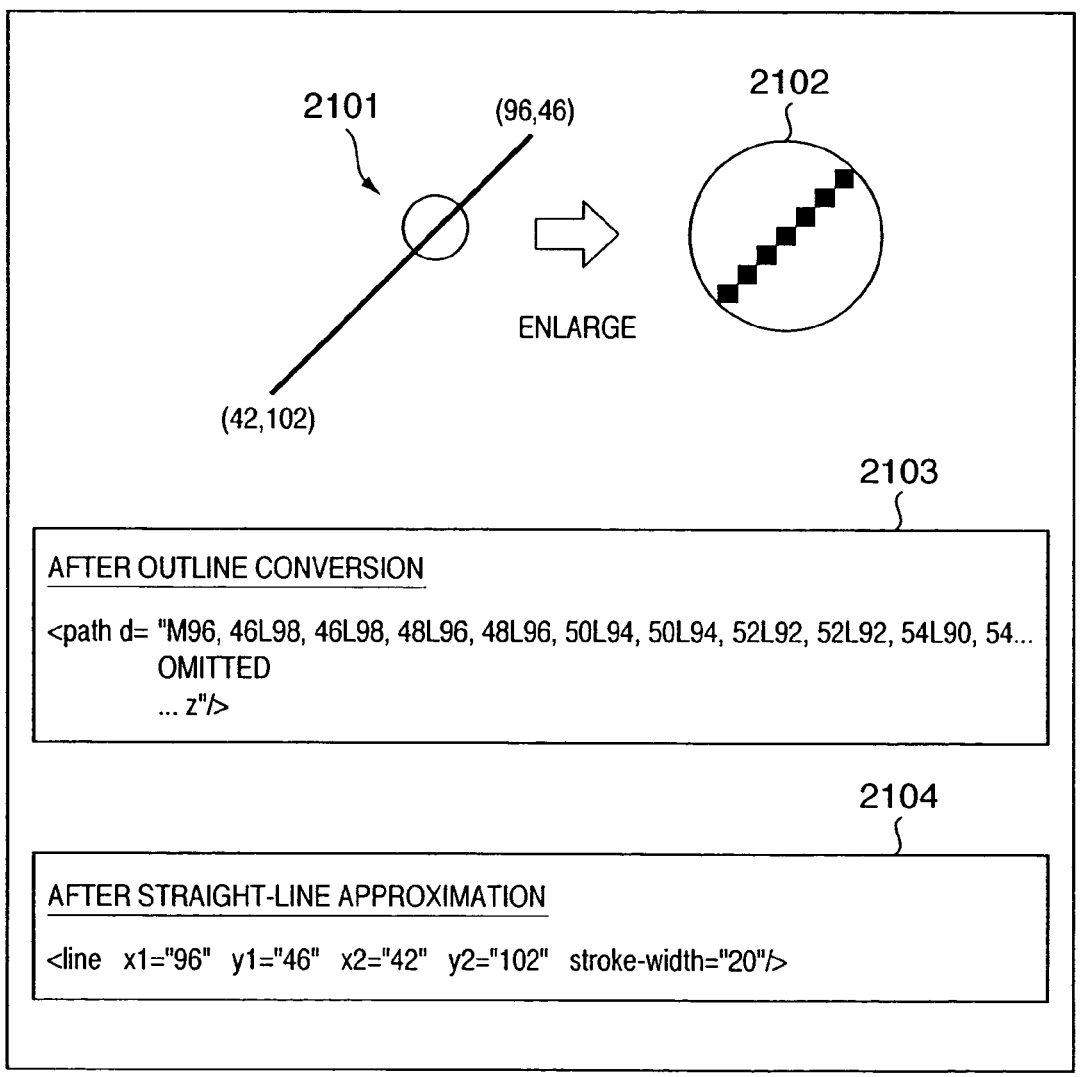
FIG. 21 shows an example of a straight-line approximation process using the description format of the svg format.

Examples of straight-line approximation, curved-line approximation, and graphic approximation processes using the description method of the svg format will be explained below using FIGS. 21 to 23. FIG. 21 shows an example of a straight-line approximation process using the description format of the svg format. FIG. 21 depicts coordinate sequence data 2103 obtained by converting a raster image 2101 into outline data. When straight-line approximation is applied to the coordinate sequence 2103, that coordinate sequence can be expressed by a small data size, as indicated by 2104. Since this image is recognized as a straight line, it can be displayed with high image quality on a viewer.

Figure 22:
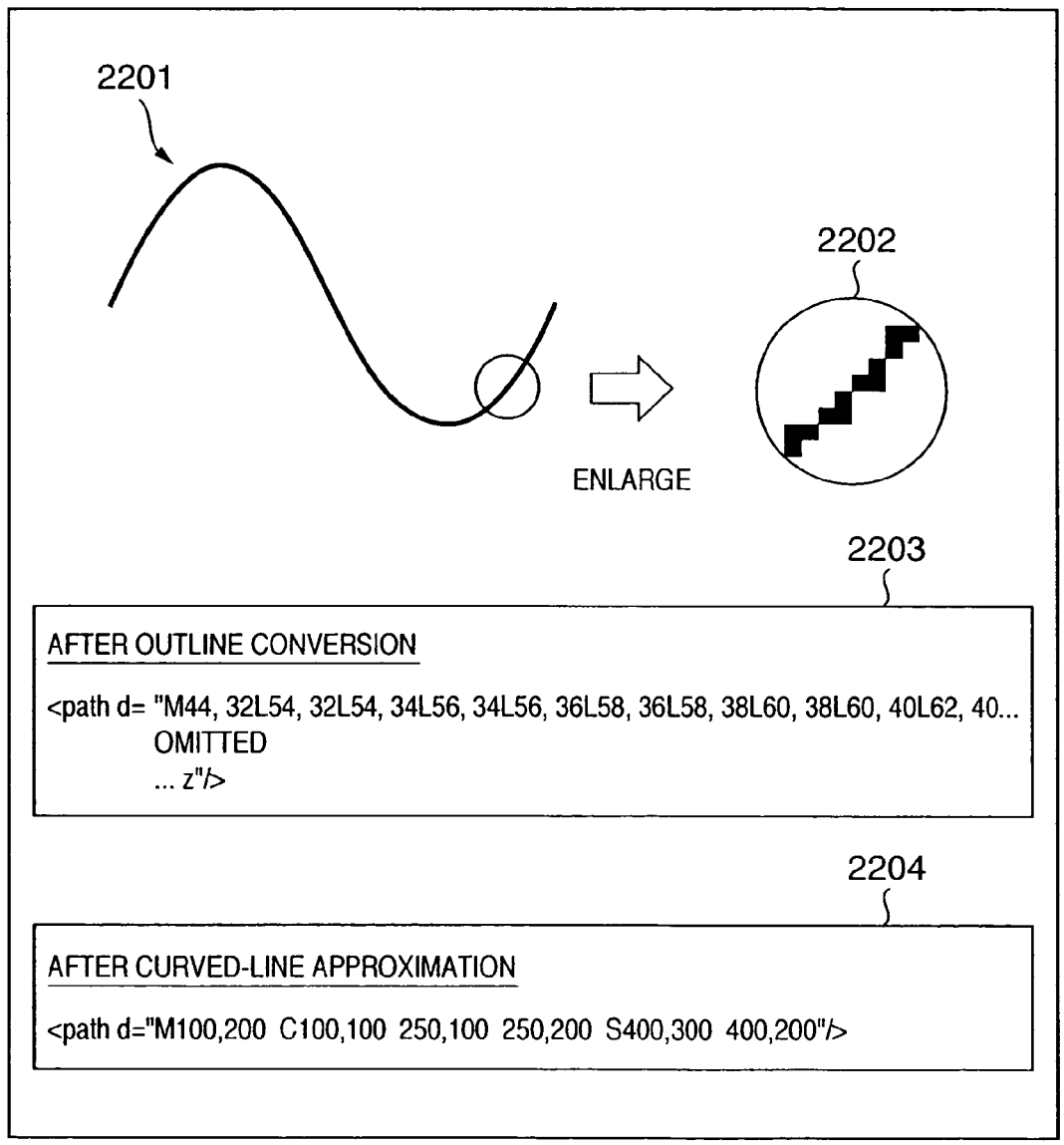
FIG. 22 shows an example of a curved-line approximation process using the description format of the svg format.
Figure 23:
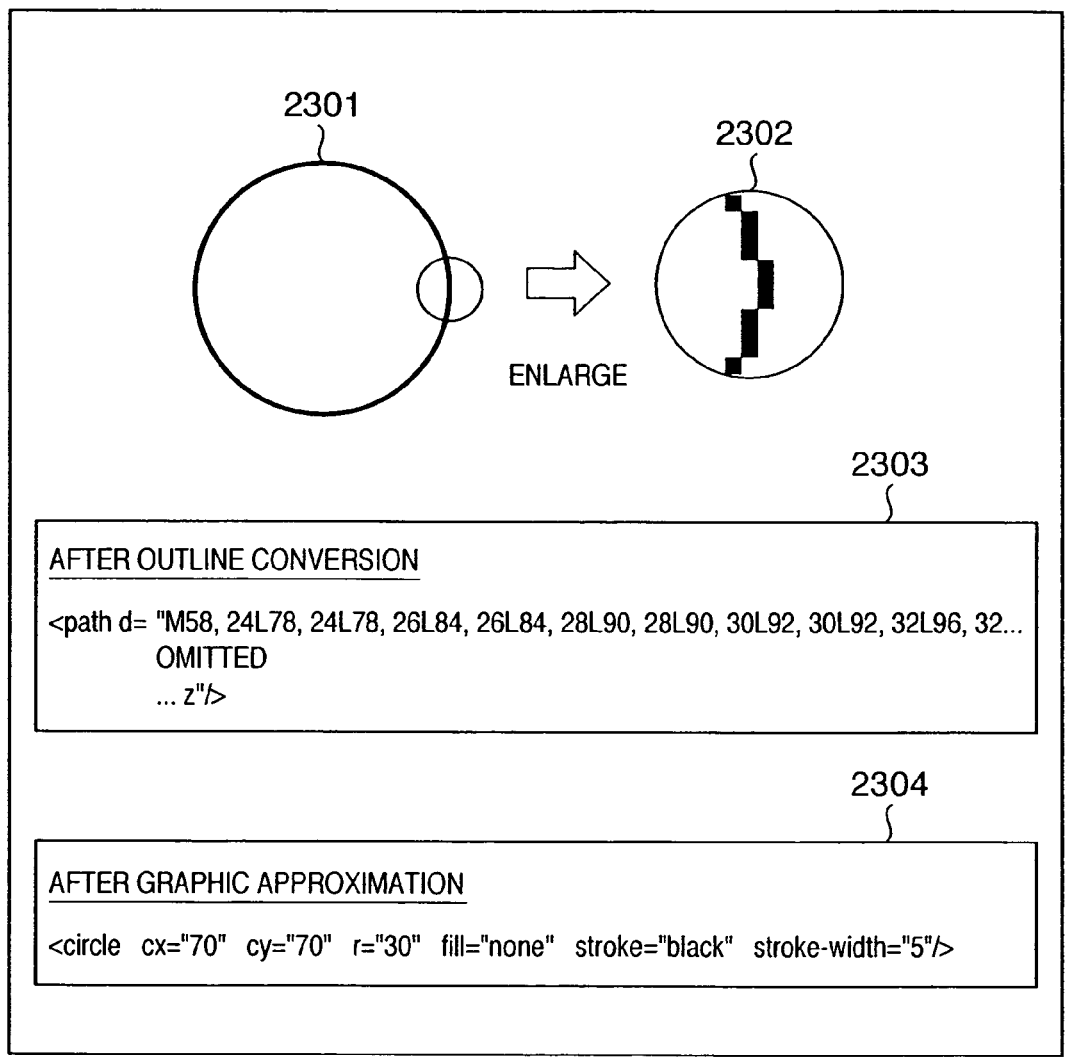
FIG. 23 shows an example of a graphic approximation process using the description format of the svg format.

Likewise, FIG. 22 shows an example of a curved-line approximation process using the description format of the svg format. Referring to FIG. 22, reference numeral 2203 denotes outline data (outline-converted coordinate sequence data) of a raster image 2201 of a curve; and 2204, curved-line approximation data. Furthermore, FIG. 23 shows an example of a graphic approximation process using the description format of the svg format. Referring to FIG. 23, reference numeral 2303 denotes outline data of a raster image 2301 of a graphic (e.g., a circle); and 2304, graphic approximation data.

As described above, respective vectorization processes (function approximation processes) can be switched in accordance with the property setups in the input operation process in step S120 or the result of the block selection process in step S122. In the input operation in step S120, whether or not function approximation is applied can be designated, as described above. Hence, switching examples of the function approximation processes for respective properties upon designation of function approximation=ON will be listed below. When the function approximation methods are switched in accordance with properties, as listed below, high-speed processing, high image quality, and a size reduction can be achieved.

In case of a text property, straight-line approximation and curved-line approximation are made.

In case of a photo property, function approximation is skipped.

In case of a table property, straight-line approximation is made.

In case of a line art property, straight-line approximation, curved-line approximation, and graphic approximation are made.

[Conversion Process into Application Data]

Figure 15:
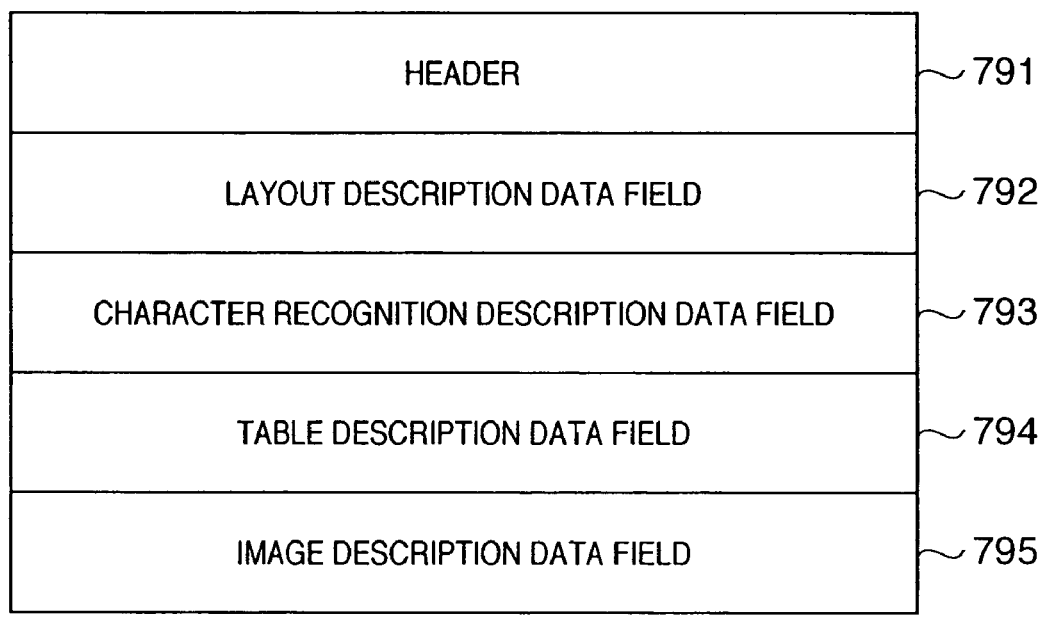
FIG. 15 shows the data structure of a file in an intermediate data format obtained as the conversion result of the block selection process and vectorization process of image data for one page.

FIG. 15 shows the data structure of a file in an intermediate data format obtained as the conversion result of the block selection process (step S122) and vectorization process (step S130) of image data for one page. The data format shown in FIG. 15 is called a document analysis output format (DAOF) hereinafter. That is, FIG. 15 shows the DAOF data structure.

Referring to FIG. 15, reference numeral 791 denotes a Header which holds information associated with document image data to be processed. Reference numeral 792 denotes a layout description data field which holds property information and block address information of respective blocks which are recognized for respective properties such as TEXT (text), TITLE (title), CAPTION (caption), LINEART (line art), PICTURE (natural image), FRAME (frame), TABLE (table), and the like.

Reference numeral 793 denotes a character recognition description data field which holds character recognition results obtained by executing character recognition of TEXT blocks such as TEXT, TITLE, CAPTION, and the like. Reference numeral 794 denotes a table description data field which stores details of the structure of TABLE blocks. Reference numeral 795 denotes an image description data field which stores image data of PICTURE blocks, LINEART blocks, and the like extracted from the document image data.

Such DAOF data itself is often saved as a file in place of intermediate data. However, in the state of a file, a general document creation application cannot re-use or re-edit individual objects. Hence, a process for converting the DAOF data into application data (step S131) will be described in detail below.

Figure 16:
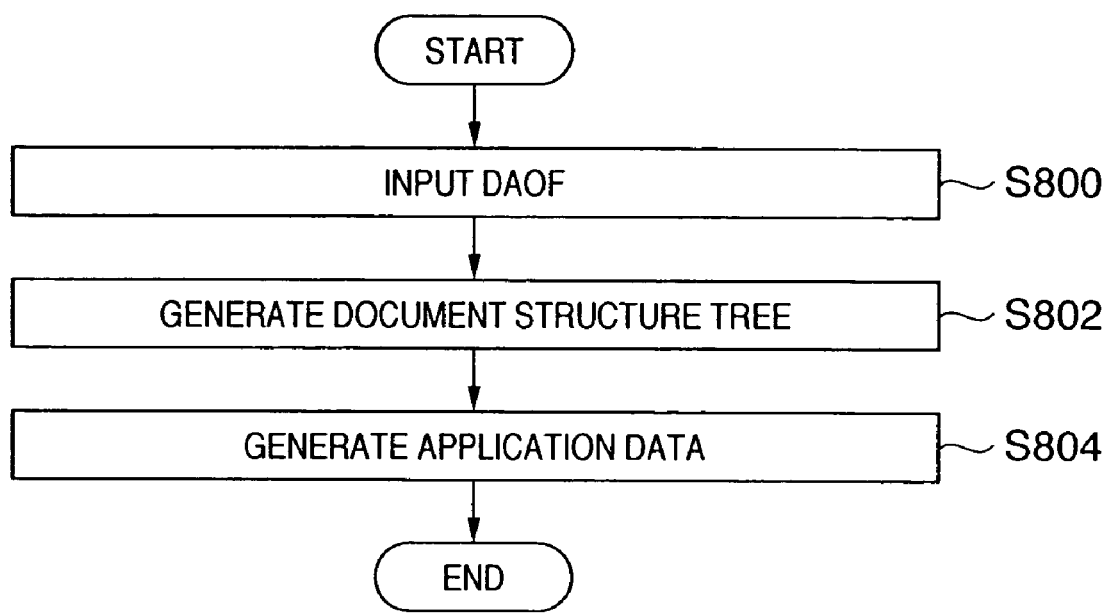
FIG. 16 is a flowchart for explaining a schematic sequence of the overall conversion process into application data.

FIG. 16 is a flowchart for explaining a schematic sequence of the overall conversion process into application data. DAOF data is input (step S800). A document structure tree which serves as a basis of application data is generated (step S802).

Actual data in the DAOF are input based on the document structure tree, thus generating actual application data (step S804).

Figure 17:
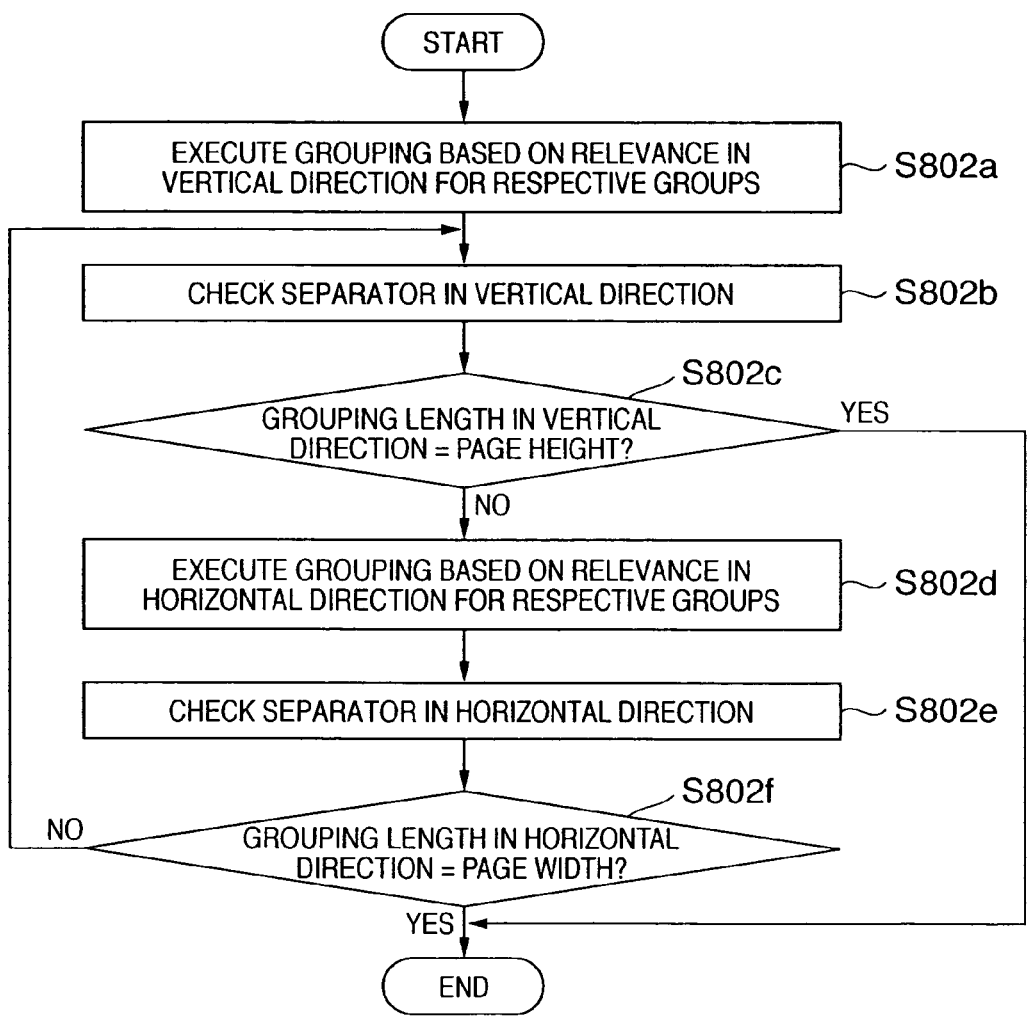
FIG. 17 is a flowchart for explaining the detailed processing sequence of a document structure tree generation process.
Figure 18A:
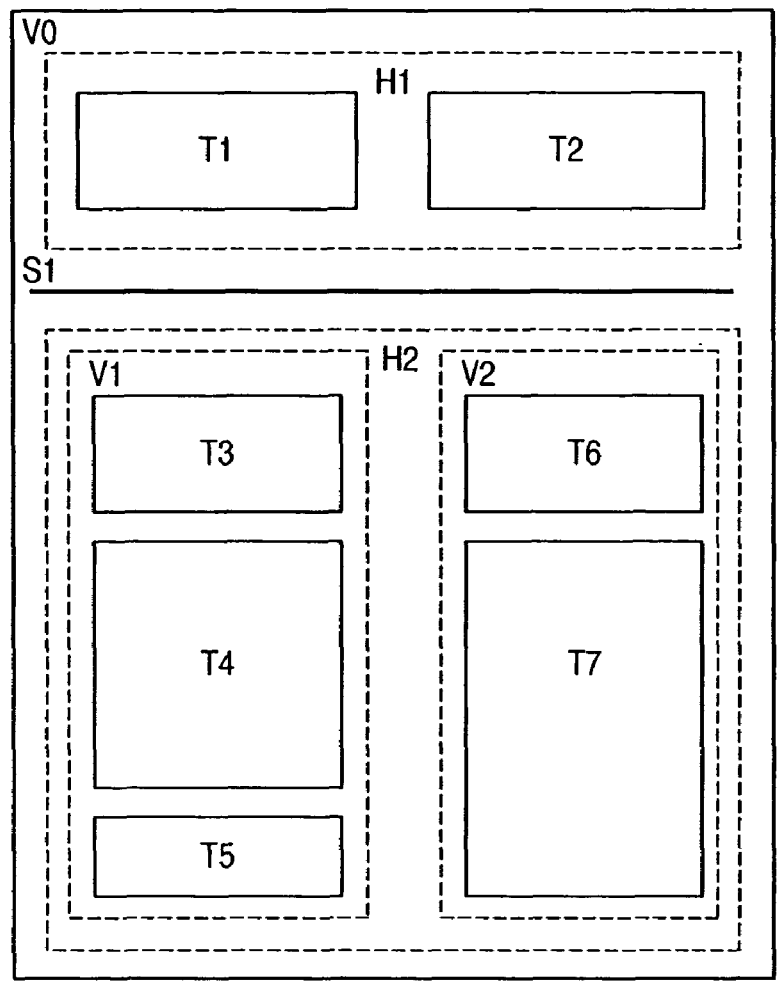
FIGS. 18A and 18B are views for explaining an outline of a document structure tree.
Figure 18B:
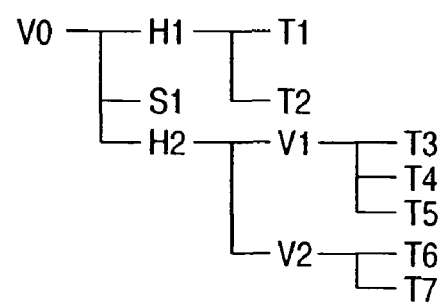

FIG. 17 is a flowchart for explaining the detailed processing sequence of the document structure tree generation process (step S802). FIGS. 18A and 18B are views for explaining an overview of a document structure tree. As a basic rule of the overall control, the flow of processes transits from a microblock (single block) to a macroblock (a set of blocks). In the following description, a block indicates a microblock and macroblock.

Re-grouping is done for respective blocks on the basis of relevance in the vertical direction (step S802a). Immediately after the flow starts, determination is made for respective microblocks. Note that relevance can be defined by checking if the distance between neighboring blocks is small, blocks have nearly the same block widths (heights in case of the horizontal direction), and so forth. Information of the distances, widths, heights, and the like can be extracted with reference to the DAOF.

FIG. 18A shows an actual page configuration, and FIG. 18B shows a document structure tree of that page. As a result of grouping in step S802a, T3, T4, and T5 form one group V1, T6 and T7 form one group V2, and these groups are generated as those which belong to an identical layer.

The presence/absence of a vertical separator is checked (step S802b). Physically, a separator is an object which has a line property in the DAOF. Logically, a separator is an element which explicitly divides blocks in an application. Upon detection of a separator, a group is re-divided in the identical layer.

It is then checked using a group length if no more divisions are present (step S802c). For example, it is checked if the grouping length in the vertical direction agrees with a page height. If the group length in the vertical direction agrees with the page height (Yes in step S802c), the document structure tree generation process ends. For example, in case of the structure shown in FIGS. 18A and 18B, groups V1 and V2 have no separator, and their group height does not agree with the page height. Hence, No is determined in step S802c, and the flow advances to step S802d.

In step S802d, re-grouping is done for respective blocks on the basis of relevance in the horizontal direction. Note that the first determination immediately after the flow starts is made for respective microblocks in this re-grouping. Definitions of relevance and its determination information are the same as those in the vertical direction. For example, in case of the structure shown in FIGS. 18A and 18B, T1 and T2 generate group H1, and V1 and V2 generate group H2. Groups H1 and H2 are generated as those which belong to an identical layer one level higher than V1 and V2.

The presence/absence of a separator in the horizontal direction is checked (step S802e). Since FIGS. 18A and 18B include separator S1, that separator is registered in a tree, thus generating layers H1, S1, and H2. It is checked using a group length if no more divisions are present (step S802f). For example, it is checked if the grouping length in the horizontal direction agrees with a page width. As a result, if the group length in the horizontal direction agrees with the page width (Yes in step S802f), the document structure tree generation process ends. On the other hand, if the group length in the horizontal direction does not agree with the page width (No in step S802f), the flow returns to step S802b to repeat the processes from relevance check in the vertical direction in an upper layer by one level. For example, in case of the structure shown in FIGS. 18A and 18B, since the group length agrees with the page width, the process ends, and uppermost layer V0 that represents the entire page is finally appended to the document structure tree.

After the document structure tree is completed, application data is generated based on that information in step S804. A practical example in case of the structure shown in FIGS. 18A and 18B will be explained below.

That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output. Since H2 includes two blocks V1 and V2 in the horizontal direction, it is output as two columns. Internal information of V1 is output in the order of T3, T4, and T5, and a new column is set. Then, internal information of V2 is output in the order of T6 and T7. In this manner, the conversion process into application data can be done.

[Appending of Pointer Information]

The pointer information appending process in step S136 will be described in detail below. When a document to be processed is specified by the retrieval process, or when a source file is reproduced by vectorization, and that document is to undergo the recording process, pointer information is appended upon recording onto a paper sheet. As a result, source file data can be easily acquired when various processes are executed again using this document.

FIG. 19 is a flowchart showing the sequence for encoding a data character string as pointer information using a 2D barcode (QR code symbol: JIS X0510) 311, and appending the converted barcode into an image.

Data to be encoded in the 2D barcode represents server address information where the corresponding file is stored, and is formed of, e.g., path information including a file server name. Or the server address information may be formed of a URL to the corresponding server, a ID used to manage the databases 105a and 105b or the storage device 111 of the MFP 100 itself which store the corresponding file, or the like.

In order to identify different types of characters to be encoded, an input data sequence is analyzed. Also, error detection and error correction levels are selected, and a minimum model number that can store input data is selected (step S900). The input data sequence is converted into a predetermined bit sequence, and an indicator indicating a mode (numeric, alphanumeric, 8-bit byte, kanji, etc.) and an end pattern are appended as needed. Furthermore, the bit sequence is converted into predetermined bit code words, thus encoding the data (step S901).

At this time, for the purpose of error correction, the code word sequence is segmented into a predetermined number of blocks in accordance with the model number and error correction level, and error correction code words are generated for respective blocks and are appended after the data code word sequence (step S902). Furthermore, the data code words of respective blocks obtained in step S902 are connected, and error correction code words and remainder code words as needed are connected after the data code word sequence to form a message (step S903).

Next, the code word module is set in a matrix together with a position detection pattern, separation pattern, timing pattern, alignment pattern, and the like (step S904). Furthermore, a mask pattern optimal to the symbol encoding region is selected, and is converted by calculating XORs with the module obtained in step S904 (step S905). Finally, type information and model number information are generated for the module obtained in step S905, thus completing a 2D code symbol (step S906).

When a digital file from, e.g., the client PC 102 is to be formed as print data, i.e., a recorded image by the forming device 112, on a paper sheet, the aforementioned 2D barcode that incorporates address information is converted into recordable raster data by the data processing device 115, and is appended to a predetermined position on raster data upon image formation. The user who received a paper sheet that has undergone image formation in this way scans that paper sheet by the image scanning unit 110, thus detecting the storage location of the server that stores an original digital file from the pointer information in step S124 above.

As means for appending additional information (address information) for the same purpose, for example, a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied in addition to the 2D barcode described in this embodiment.

As described above, according to this embodiment, a digital file of an application format of the user's choice (designated by the client side) can be efficiently acquired based on image data obtained by scanning a document.

Note that the properties of the document are not limited to those described above, and various changes may be made (e.g., a map mode and the like may be added).

In any case, efficient processes can be made and a file of a desired format can be acquired by changing parameters for property determination in accordance with the designation of the properties and that of the conversion contents, and by changing the data conversion methods and conversion processes to be executed.

Second Embodiment

An embodiment that considers the file access right will be explained below. Our document files often include documents re-use of which by a third party is preferably limited. The above embodiment has been explained under the condition that all files stored in the file server can be freely accessed, and the entire file or some objects of the file are re-usable. Hence, a case will be explained below wherein when a file is retrieved based on pointer information, the access right of the file that is specified as a result of the search is limited.

FIG. 9 is a flowchart for explaining the processing sequence for searching a server that stores digital files using pointer information including a file access right. Since steps S400 to S403 in FIG. 9 are the same as those in FIG. 8, a description thereof will be omitted. If a file is specified in step S403 (Yes), the file server checks access right information of that file (step S404). As a result, if the access right of that file is limited (Yes in step S404), the file server requests the MFP 100 to transmit a password (step S405).

The MFP 100 prompts the operator to input a password, and transmits the input password to the file server (step S406). The file server collates the received password to make authentication (step S407). If authentication has succeeded, the file server notifies the address of the digital file, as has been explained using FIG. 3, and transfers a file to the MFP 100 if the process that the user wants is acquisition of image data (step S408).

Note that the authentication method for access right control is not limited to the method using the password in steps S405 and S406. For example, various other authentication means such as popular biological authentication (e.g., fingerprint authentication), authentication using a card, and the like can be adopted.

In this embodiment, a file is specified by pointer information additionally given to a paper document. The same control can be applied to a case wherein a file is specified by the retrieval process in steps S127 to S129 in FIG. 3.

On the other hand, if the file cannot be specified from the file server in step S403, the vectorization process explained in step S130 in FIG. 3 can be limited. That is, when a limitation of the access right to an original digital file is detected from image data obtained by scanning a paper document, the vectorization process is executed only when authentication is successful, thus limiting use of documents with high secrecy.

Third Embodiment

In the above embodiments, as means for specifying original file data held by the server from image information obtained by scanning a document image, either means for specifying a document based on pointer information appended to the document or means for retrieving and specifying a corresponding digital file on the basis of each object information described in the document is used, as shown in FIG. 3. By contrast, in order to specify an original file more accurately, both the means may be used in combination.

That is, even when the presence of an original file can be detected based on pointer information obtained from a document image, a layout retrieval process according to layout information or a full-text retrieval process based on a keyword obtained by character recognition is also applied to the detected file using object information in the document. A digital file that can yield a high matching rate is formally specified as an original file. For example, even when the lower-bit part of pointer information is doubtful and cannot be corrected by error correction, a file can be specified by narrowing down the retrieval range. Therefore, a digital file can be quickly and accurately specified.

Fourth Embodiment

In the above embodiments, when the retrieval process cannot specify an original file, the entire image information undergoes a vectorization process. By contrast, for example, in case of a general document, not all objects in the document are newly created, and some objects may be diverted from other files. For example, a document creation application prepares some patterns of background objects (wallpapers), and the user normally selects and uses one of these patterns. Hence, such object is more likely to be present in other document files in the document file database as re-usable vector data.

Hence, as another embodiment of the vectorization process (step S130) in FIG. 3, the database is searched for a file which includes an object which matches each of individual objects segmented by the block selection process. Vector data of the matched object is individually acquired from that file. As a result, the input document need not be fully vectorized but can be vectorized more quickly. Furthermore, deterioration of image quality due to the vectorization process applied to parts that do not require any vectorization process can be prevented.

On the other hand, if the retrieval process (step S127) in FIG. 3 can specify an original file as a PDF, that PDF often has, as an additional file, character codes obtained by already applying character recognition to text objects in that document. Upon vectorizing such PDF file, if the character code file is used, a character recognition process in the vectorization process in step S130 and subsequent steps can be skipped. That is, the entire vectorization process can be done more quickly.

Fifth Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, a document such as a paper document or the like can be acquired as data of a format that allows easy re-use and re-edit processes. In addition, data of a desired format can be easily acquired by variably setting parameters used in feature recognition of image information, and setting conversion processes to be used in conversion.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-385184 filed on Nov. 14, 2003, which is hereby incorporated by reference herein.

What is claimed is:

1. An image processing system comprising:
   an acquisition unit constructed to acquire image data;
   a separation unit constructed to separate the image data into a plurality of regions, including a region of a text attribute;
   a character processing unit constructed to obtain a character code based on the image data in the region of the text attribute;
   a vectorization unit constructed to convert the image data in the region of the text attribute into vector data;
   an accepting unit constructed to variably accept, from a user, a first instruction that causes the character processing unit to operate, a second instruction that causes the vectorization unit to operate, or both the first and second instruction; and
   a control unit constructed to:
   (i) control, in a case that the accepting unit accepts the first instruction and does not accept the second instruction, to cause the character processing unit to obtain a character code based on the image data in the region of the text attribute, and to cause the vectorization unit to not operate,
   (ii) control, in a case that the accepting unit does not accept the first instruction and accepts the second instruction, to cause the vectorization unit to convert the image data in the region of the text attribute into vector data, and to cause the character processing unit to not operate, and
   (iii) control, in a case that the accepting unit accepts both the first instruction and second instruction, to cause the character processing unit to obtain a character code based on the image data in the region of the text attribute and to cause the vectorization unit to convert the image data in the region of the text attribute into vector data.

2. The system according to claim 1, wherein the vectorization unit comprises:
   an outline conversion unit constructed to apply outline conversion to the image data in the region of the text attribute.

3. The system according to claim 1, wherein the character processing unit comprises:
   a character recognition unit constructed to apply a character recognition process to characters in the document; and a font-conversion unit constructed to substitute the characters by font data on the basis of a character recognition process result of the character recognition unit.

4. The system according to claim 3, wherein the font-conversion unit further comprises a format conversion unit constructed to convert a converted object into a format that can be handled by a predetermined software application.

5. The system according to claim 1, further comprising:
   a storage unit constructed to store the vector data converted by the vectorization unit at a predetermined storage location;
   a generation unit constructed to generate information associated with the storage location of the vector data as additional information; and
   a notifying unit constructed to notify a user of the additional information.

6. The system according to claim 1, further comprising:
   a generating unit constructed to generate application data based on at least one of the character codes converted by the character processing unit and the vector data converted by the vectorization unit.

7. An image processing method comprising:
   performing, by a computer, the following steps:
   a scanning step of acquiring image data;
   a separation step of separating the image data into a plurality of regions, including a region of a text attribute;
   a character processing step of obtaining a character code based on image data in the region of the text attribute by a character processing unit;
   a vectorization step of converting the image data in the region of the text attribute into vector data by a vectorization unit;
   an accepting step of variably accepting, from a user, a first instruction that causes the character processing unit to operate, a second instruction that causes the vectorization unit to operate, or both the first and second instruction; and
   a control step of:
   (i) controlling, in a case that the accepting step accepts the first instruction and does not accept the second instruction, to cause the character processing unit to obtain a character code based on the image data in the region of the text attribute, and to cause the vectorization unit to not operate,
   (ii) controlling, in a case that the accepting step does not accept the first instruction and accepts the second instruction, to cause the vectorization unit to convert the image data in the region of the text attribute into vector data, and to cause the character processing unit to not operate, and
   (iii) controlling, in a case that the accepting step accepts both the first instruction and second instruction, to cause the character processing unit to obtain a character code based on the image data in the region of the text attribute and to cause the vectorization unit to convert the image data in the region of the text attribute into vector data.

8. The method according to claim 7, wherein the steps performed by the computer further comprise
   a generating step of generating application data based on at least one of the character codes converted in the character processing step and the vector data converted in the vectorization step.

9. An image processing apparatus comprising:
   an acquisition unit constructed to acquire image data corresponding to a scanned document;

a separation unit constructed to separate the image data into a plurality of regions, including a region of a text attribute;

a character processing unit constructed to obtain a character code based on image data in the region of the text attribute;

a vectorization unit constructed to convert the image data in the region of the text attribute into vector data;

an accepting unit constructed to variably accept, from a user, a first instruction that causes the character processing unit to operate, a second instruction that causes the vectorization unit to operate, or both the first and second instruction; and a control unit constructed to:
  (i) control, in a case that the accepting unit accepts the first instruction and does not accept the second instruction, to cause the character processing unit to obtain a character code based on the image data in the region of the text attribute, and to cause the vectorization unit to not operate,
  (ii) control, in a case that the accepting unit does not accept the first instruction and accepts the second instruction, to cause the vectorization unit to convert the image data in the region of the text attribute into vector data, and to cause the character processing unit to not operate, and
  (iii) control, in a case that the accepting unit accepts both the first instruction and second instruction, to cause the character processing unit to obtain a character code based on the image data in the region of the text attribute and to cause the vectorization unit to convert the image data in the region of the text attribute into vector data.

10. The apparatus according to claim 9, further comprising:

a generating unit, constructed to generate application data based on at least one of the character codes converted by the character processing unit and the vector data converted by the vectorization unit.

* * * * *